United States Patent [19]
Ferguson et al.

[11] Patent Number: 5,819,092
[45] Date of Patent: Oct. 6, 1998

[54] ONLINE SERVICE DEVELOPMENT TOOL WITH FEE SETTING CAPABILITIES

[75] Inventors: Charles H. Ferguson, Cambridge; Randy J. Forgaard, Lexington, both of Mass.

[73] Assignee: Vermeer Technologies, Inc., Cambridge, Mass.

[21] Appl. No.: 944,365

[22] Filed: Oct. 6, 1997

Related U.S. Application Data

[63] Continuation of Ser. No. 336,300, Nov. 8, 1994, abandoned.

[51] Int. Cl.$^6$ ............................. G06F 15/00; G06F 17/40
[52] U.S. Cl. .............................................. 395/701; 705/39
[58] Field of Search ............................... 395/701; 705/39

[56] References Cited

U.S. PATENT DOCUMENTS

| | | | |
|---|---|---|---|
| 5,204,897 | 4/1993 | Wyman | 380/4 |
| 5,220,501 | 6/1993 | Lawlor et al. | 705/43 |
| 5,287,270 | 2/1994 | Hardy et al. | 705/34 |
| 5,325,431 | 6/1994 | Naruse | 380/16 |
| 5,359,508 | 10/1994 | Rossides | 705/30 |
| 5,367,561 | 11/1994 | Adler et al. | 705/42 |

FOREIGN PATENT DOCUMENTS

| | | |
|---|---|---|
| 0483576A3 | 5/1992 | European Pat. Off. . |
| WO 93/08661 | 4/1993 | WIPO . |

OTHER PUBLICATIONS

IBM Technical Disclosure Bulletin, "Multimedia Audio on Demand," vol. 37, No. 06B, Jun. 1994., pp. 451–460.
Telescan, Inc. New Release, *Telescan Announces Major Online Technology Breakthrough*, Jun. 1994, pp. 1–2.
Telescan, Inc. 1993 Summary Annual Report, pp. 1–13.
Ziff Announces Interchange Partners, *The Seybold Report on Publishing Systems: The Latest Word*, Apr. 1994, USA, p. 40.
Sherman, Sue, Spyglass Signs Agreement with NCSA to Enhance and Broadly Relicence . . . , *Internet World*, Jun., 1994, pp. 1–5.
Sherman, Sue, Frequently Asked Questions (FAQs) About Mosaic, *Internet World*, Jun., 1994, pp. 1–5.
Sherman, Sue, Passport to Electronic Publishing and Commerce on the Internet, *Internet World*, Jun., 1994, pp. 1–7.
Sherman, Sue, Spyglass, Inc., *Spyglass Inc.*, Jun. 1994, pp. 1–2.

(List continued on next page.)

*Primary Examiner*—Emanuel Todd Voeltz
*Assistant Examiner*—John Q. Chavis
*Attorney, Agent, or Firm*—Ronald M. Anderson

[57] ABSTRACT

A visual editing system for creating commercial online computer services. The visual editing system creates online services that consist of a number of subservices. Each subservice is a program that provides a particular type of functionality to the online service. Different subservices exist for displaying hypermedia documents, searching directories and databases, displaying classified advertisements, providing a bulletin board system, etc. Each subservice has an associated database of information and a collection of scripts that handle events such as input from a user. The visual editing system of the present invention features a fee setting tool that allows the developer to develop a fee structure for an online service. The fee structure can handle both fees levied against users and third party content providers. For example, users can be levied fees for logging onto an online service, performing searches, or downloading information. Third party content providers can be levied fees for submitting advertisements or for executing a transaction with a user. Similarly, the fee setting tool also allows the developer to assign a payment system whereby users or content providers can be paid for certain actions. A user may be paid when that user that fills out a marketing questionnaire or wins a contest. A third party content provider can be paid when that third party content provider supplies valuable information desired by the users of the online service.

44 Claims, 25 Drawing Sheets

OTHER PUBLICATIONS

Mosaic: A Commercial World Wide Web Browser from Spyglass® (Promo Flyer), *Internet Shopping Network,* 1994, pp. 1–2.

SoftQuad, Inc., SoftQuad HoTMetal PRO (Promo flyer), 1994, pp. 1–5.

Glicksman, et al., Internet Publishing via the World Wide Web: Enterprise Integration Technologies, *Proceedings of Groupware 1994,* Aug. 1994.

InterServ: Desktop to Internet, WebMaster Services, Jun. 1994, pp. 1–6.

NovX Systems Integration, NovX Internet Security Solutions (Promo flyer), (undated).

NovX Systems Integration, Internet Integration Solutions, 1994, pp.1–2.

NovX Systems Integration, InterServ: Connecting the Global Network to your Desktop, 1994, pp. 1–2.

NovX Systems Integration, InterServ: NovX Product Brochure (Promo), 1994, pp. 1–4.

NovX Systems Integration, Internet Server Systems Spider–Series™, Jun. 1994, pp. 1–5.

NovX Systems Integration, Internet Server Systems Global–Series™, Jun. 1994, pp. 1–9.

Goodman, M., InterServ Offers WebMaster Internet Services for Online Multimedia Publishing (NovX Systems Integration), Jul. 1994, pp. 1–2.

Goodman, M., NovX Announces the "Spider–Series™", a new llne of prepackaged Internet servers, (Novx Systems Integration), Jul. 1994, pp. 1–2.

Goodman, M., NovX Announces the first commercially available line of Gopher, WWW, and FTP Internet servers and integration services (NovX Systems Integration), May 1994, pp. 1–3.

Mukhopadhyay, D., A Generic Information Retrieval System to Support Interoperability, (Bellcore), pp. 14–21.

Freund, R. et al., Special Issue on Heterogeneous Processing, *Journal of Parallel and Distributed Computing,* 1994, vols. 20–23, pp. 255–315.

Reddy, R., et al., Second Workshop on Enabling Technologies: Infrastructure for Collaborative Enterprises, IEEE Computer Society Press, Apr. 1993, pp. 1–233.

Hurson, A.R., et al., Multidatabase Systems: An Advanced Solution for Global Information Sharing, IEEE Computer Society Press, 1994, pp. 1–59.

Zhao, J. et al., An Integrated Approach to Task–Oriented Database Retrieval Interfaces, *British Computer Society,* 1993, pp. 55–73.

Ligon III, W.B., et al., An Empirical Methodology for Exploring Reconfigurable Architectures, *Journal of Parallel & Distributed Computing,* 1993, pp. 323–337.

Graefe, G., et al., Encapsulation of Parallelism and Architecture–Independence in Extensible Database Query Execution, *IEEE Transactions on Software Engineering,* Aug. 1993, pp. 749–764.

Huang, Yen–Min, et al., Designing an Agent Synthesis System for Cross–RPC Communication, *IEEE Transactions on Software Engineering,* Mar. 1994, pp. 188–198.

Donaldson, Cameron, InQuisiX™ An Electronic Catalog for Software Reuse, *Sigir Forum: A Publication of the Special Interest Group on Information Retrieval,* Spring 1994, pp. 8–12.

Novel AppWare™—A System for Developing Network Applications, White Paper, *Novell, Inc.,* Jul. 1993, pp. 1–43.

Hughes, Kevin. Entering the World–Wide Web: A Guide to Cyberspace *Siglink Newsletter,* Mar. 1994, pp. 1–16.

The Annual Sigir '93: 16th International Conference on Research & Develop–,ment iin Information Retrieval, *ACM Sigir Forum,* Jun.–Jul. 1993, pp. 48–52.

*Siglink Newsletter,* vol. 2, No. 3, Dec. 1993, pp. 1–6.

*Siglink Newsletter,* vol. 2, No. 2, Sep. 1993, pp. 1–16.

*Siglink Newsletter,* vol. 2. No. 1, Mar. 1993, pp. 1–16.

*Siglink Newsletter,* vol. 1, No. 2, Dec. 1992, pp. 1–52.

*Siglink Newsletter,* vol. 1, No. 1, Mar. 1992, pp. 1–32.

Submission Guidelines, ITI—Software Patent Institute (SPI), Mar. 1993, pp. 35–45.

Hwang, Kai. Announcements of Special Issues, *Journal of Parallel & Distributed Computing,* 1994, pp. 24–39.

Garlan, D., et al., Special Issue on Software Architecture, *IEEE Transactions on Software Engineering,* Aug. 1994, p. 844.

*Sigir '94: 17th Int'l. Conference on Research & Development in Information Retrieval*—Call for Papers, Jul. 1994, p. 13.

| Script Name | Visual Object | Event | Document | Subservices |
|---|---|---|---|---|
| Purchase | Purchase_Button | Mouse_Down | Order_Form | Online_Catalog |
| Show Form | <None> | <None> | <None> | Online_Catalog |
| Submit Form | <None> | <None> | <None> | Online_Catalog |
| Submit Change | | | | Online_Catalog |
| Show Message | | | | |

*Script View*

*Figure 12*

Purchase Order Form

Item No.: 27865

Purchase Price | $129.99
Shipping | $5.00
Tax | $10.80
Total | $145.79

Please enter payment information:

| | Payment Source | Account No. | Exp. Date |
|---|---|---|---|
| ✓ | VISA | 011 234 543 290 | 12/31/95 |
| | Master Card | | |
| | American Express | | |
| | Checking Acct. | | |

1630 - Purchase
1640 - Cancel Purchase

| | Fee Name | Action | Arguments | Entity |
|---|---|---|---|---|
| click here to edit fee computation | Login | Connect | | User |
| | Ad Submission | Submit | /pub/www/third_party_ads/new_listing.html | Provider |
| | Classified Ad Submission | Submit | /pub/www/classifieds/new_listing.html | User |
| | Read Power User Manual | Access | /pub/www/documents/power_user.html | User |
| | Pay Third Party | Access | /pub/www/third_party_sales/sell_object.html | Provider |

*Fee View*

*Figure 23*

| Fee Name | Classified Advertisement Submission |
|---|---|
| Action | Submit |
| Argument | /pub/www/classified_ads/new_listing.html |
| Entity | User |

Fee Calculation

```
<
Fee@ = EntryCategoryCount%(<Arg$>) * FileLen%(<Arg$>) * 0.01
>
```

*Fee Computation*

*Figure 24*

ONLINE SERVICE DEVELOPMENT TOOL WITH FEE SETTING CAPABILITIES

This application is a file wrapper continuation application, based on prior application Ser. No. 08/336,300, filed on Nov. 8, 1994, now abandoned, the benefit of the filing date of which is hereby claimed under 35 U.S.C. § 120.

FIELD OF THE INVENTION

The present invention relates to the field of online computer services. In particular, the present invention discloses a software tool for setting fees in an online service, as part of a visually oriented tool for creating online services.

BACKGROUND OF THE INVENTION

With the increasing popularity of computer communications, many companies are becoming interested in advertising and supporting their products using an online computer service that can be accessed by customers. However, creating a large online computer service is an extensive task. To develop a sophisticated online service, such as America Online®, CompuServe®, Genie®, or Prodigy®, a company must have a large mainframe computer and customized software. Developing the customized software requires a competent programming staff and a good deal of time. Most companies do not have the resources required to develop such systems, and thus cannot easily develop and maintain an online presence.

One way a company can contact millions of potential customers is to use the global Internet. The global Internet is a network of computer networks that links together millions of computer systems using the well defined TCP/IP protocol.

A new method of distributing and viewing information known as the World-Wide Web has recently become very popular on the global Internet. The World-Wide Web is a collection of servers connected to the Internet that provide multi-media information to users that request the information. The users access the information using client programs called "browsers" to display the multi-media information.

World-Wide Web servers store multi-media information in a document format known as HyperText Markup Language (HTML). The World-Wide Web servers distribute the HTML formatted documents using a specific communication protocol known as the HyperText Transfer Protocol (HTTP).

To access the multi-media information available on World-Wide Web servers, a user runs a client browser program that accesses the HTML formatted documents stored on the HTTP servers connected to the global Internet. The client browser program retrieves the formatted information and provides the information in an appropriate manner to the user. For example, the client browser program displays graphical image information as images on the user's graphical display screen; plays video information as video animation on the user's graphical display screen; displays text information as text on the user's screen; and plays sound samples using the speakers on the user's computer system. "Mosaic", one popular client browser program, is widely available to the users of the global Internet.

For a company that wishes to develop an online presence, creating a World-Wide Web Server would provide a feature rich online service available to customers and clients. A World-Wide Web Server can store images, text, animation, and sounds that provide information about the company. Furthermore, World-Wide Web Servers can be implemented on relatively simple computer systems, including personal computers.

Most World-Wide Web Servers are coupled to the global Internet. By deploying a World-Wide Web Server on the global Internet a company would create online service that is accessible to the millions of global Internet users.

Alternatively, a company can deploy a HTTP server that is available to customers through dial-up phone service. A dial-up HTTP server would be accessible to customers and clients that do not have Internet access. Thus, by creating a simple HTTP server, any organization or corporation can create an online presence.

However, quickly creating the HTML formatted documents required for a World-Wide Web Server is not a trivial task. Moreover, the standard HTTP server software, without any additional programming, is very limited. For example, without custom extensions, an HTTP server cannot accommodate complex transactions between a user and the HTTP server or integrate a database system into an online service. Although it is possible to write custom extensions to the HTTP server software using a conventional programming language, such custom extensions are difficult to write except by experienced programmers. Thus, to be able to quickly deploy full-featured HTTP servers, it would be desirable to have a development tool usable by non-programmers that allows a developer to quickly and easily create a full-featured online service based upon the HTTP and HTML standards.

Many programming development tools are known in the art. These programming development tools range from tools which are developed and marketed as general purpose programming development tools to sophisticated special purpose development tools for developing specific types of applications.

For example, the Information Exchange Facility (IEF) general development tool, which is available from Texas Instruments, is used by professional programmers to develop application programs. Essentially, IEF provides a facility that allows a programmer to write "pseudo code" and IEF generates an intermediate source code program in a high level programming language (such as COBOL or C code) based on the "pseudo code". IEF is an example of what will be referred to herein as a "general purpose development tool" because it allows development of programs for essentially any purpose or application dependent on the input provided by the programmer.

In contrast to general purpose software development tools, many application programs themselves provide special purpose "development tool" capability. An example is the Paradox™ database program available from Borland International of Scotts Valley, Calif. The Paradox™ database allows end users to develop sophisticated database applications which would have been developed by professional programmers a few years ago. The Paradox™ database is but one example of a special purpose development tool.

Another example of a special purpose development tool, perhaps more pertinent to the present invention, is the Application Development Environment of Lotus Notes™ which is available from Lotus Development Corporation of Cambridge, Mass. The Application Development Environment of Lotus Notes provides features which are said to allow for rapid development of workgroup applications such as sharing of documents between users over a network.

Generally, Lotus Notes and, thus, its Application Development Environment, is directed at sharing of documents among persons in an authorized work group. For example, a Lotus Notes application can be envisioned which would allow for sharing of key patent applications among patent examiners in a particular art group at the United States Patent Office.

The Lotus Notes Application Development Environment provides for such features as (i) application design templates which are said to allow sophisticated applications to be built by customizing pre-built applications such as document libraries, form-based approval systems, project tracking applications and status reporting systems; (ii) security; (iii) database access; and (iv) discussion groups. However, while these features are useful, the Lotus Notes Application Development Environment, as well as Lotus Notes itself, has its shortcomings as admitted to by even Lotus Development Corporation itself:

Lotus Notes was not intended to be used as a transaction-processing front-end to an operational database system. Operational systems are those which support transactions that are essential to the operation of an organization. Examples of these systems would be traditional order entry . . . *Lotus Notes: An Overview, October, 1993*, pg. 11

It has been recognized by the present invention that many of these functions neglected by Lotus Notes are very important when developing publicly accessible online systems. Specifically, the ability to perform commercial transactions that involve order entry systems would allow an online system to sell goods and services to computer users. It is now recognized by the present invention that many functions such as traditional order entry systems and the like will someday be carried out over computer networks by allowing a customer to place orders for goods and services directly with an online service. By way of example, even today, food orders can be placed with restaurants over computer networks; videos can be reserved at the local video store; and banking transactions can be carried out simply by logging onto a computer network.

Four different types of commercial transactions might commonly occur in a commercial online service. First, a user may be charged for the right to access all or parts of a useful publicly accessible online system. Second, the online service may pay the user for performing some type of action such as winning a contest or completing a marketing survey. Third, an online service may charge a content provider for placing certain information on the online service. For example, a content provider can be charged for placing an advertisement on the online service. Finally, a content provider can be paid by the online service for providing information that users may wish to access, can be can be provided on a for-fee basis. Conversely, an online service provider may wish to pay third party content providers for placing useful material on the online service.

Thus, when creating a publicly accessible online system, it is desirable to include the ability to define fee structures for accessing parts of the online system and/or ordering other goods or services. However, creating a sophisticated commercial online service with such features usually requires specialized programming.

The ability to set fees to be paid by the user for an amount of data accessed, the time spent "logged on" to the online service, or the purchase of particular merchandise is one example of distinction from Lotus Notes. Lotus Notes is not only admitted (by even Lotus Development Corporation) as lacking transaction oriented capability as may be required by such applications, but it also does not provide the metering functions to keep track of the information necessary to assign such fees as is required by these applications. As such, the video store, restaurant or bank (by way of example) is left with the need to employ professional programmers for their individual applications.

Thus, it has been discovered that there exists a need to create online system development tools that include features, functions and capabilities to support commercial online services such as the aforementioned fee setting function.

These and other aspects of the present invention will be described in greater detail with reference to the below detailed description and the accompanying figures.

SUMMARY AND OBJECTS OF THE INVENTION

It is thus an object of the present invention to provide a fast, user-friendly method of designing and deploying an online system.

It is a further object of the present invention to provide a visual editor that allows a developer to easily create distributed online services. In particular, it is an object of the present invention to allow a developer to create customized HTTP server software and accompanying HTML documents in order to deploy a World-Wide Web Server.

It is yet a further object of the present invention to provide a sophisticated fee setting tool that allows a developer to assign a system of fees for access to an online service. The fee setting tool allows complex fee arrangements to be created using a well defined scripting language.

These and other objects are provided by the Online Designer of the present invention. The Online Designer is a visual editor that allows a developer to create an online service that consists of a set of standardized subservices. The subservices include a Hyperdocument/Commerce subservice for displaying hyperdocuments and performing electronic transactions, a Classified Advertisement subservice for implementing electronic classified advertisements, a Reference subservice for implementing online reference works, a Directory Lookup subservice for implementing online searchable directories of information, a Bulletin Board subservice for providing a means for allowing users to post and view messages, a Document Retrieval subservice to provides a means for retrieving documents, an Electronic Publishing subservice that provides electronic editions of newspapers or magazines that may be downloaded, and a Meta-Service subservice that provides access to other external online services.

The visual editing system of the present invention features a unique fee setting tool that allows a developer of an online service to develop a fee structure for the online service. The fee structure for the online service can handle fees levied against both users and third party content providers. For example, a user can be levied fees for logging onto an online service, performing searches, or downloading information. Third party content providers can be levied fees for submitting advertisements or for executing a transaction with a user. Similarly, the fee setting tool also allows the online service developer to assign a payment system whereby users or content providers can be paid for certain actions. For example, a user may be paid when that user fills out a marketing questionnaire or wins a contest. A third party content providers may be paid when that content provider supplies valuable information desired by users of the online service.

Other objects, features and advantages of the present invention will be apparent from the accompanying drawings, and from the detailed description that follows below.

BRIEF DESCRIPTION OF THE DRAWINGS

The objects, features, and advantages of the present invention will be apparent from the following detailed description of the preferred embodiment of the invention with references to the following drawings.

FIG. 12 illustrates a screen display of the Hyperdocument Designer Script View.

FIG. 16 illustrates a screen display of a hypermedia document used to order a product.

FIG. 18 illustrates a submit form in the Form View of the Lookup Designer subtool.

FIG. 20 illustrates a query form in the Form View of the Lookup Designer subtool.

FIG. 23 illustrates a screen display of the Fee Setting subtool.

FIG. 24 illustrates a screen display of the Fee Specifier editor subtool.

NOTATION AND NOMENCLATURE

Figure 1:
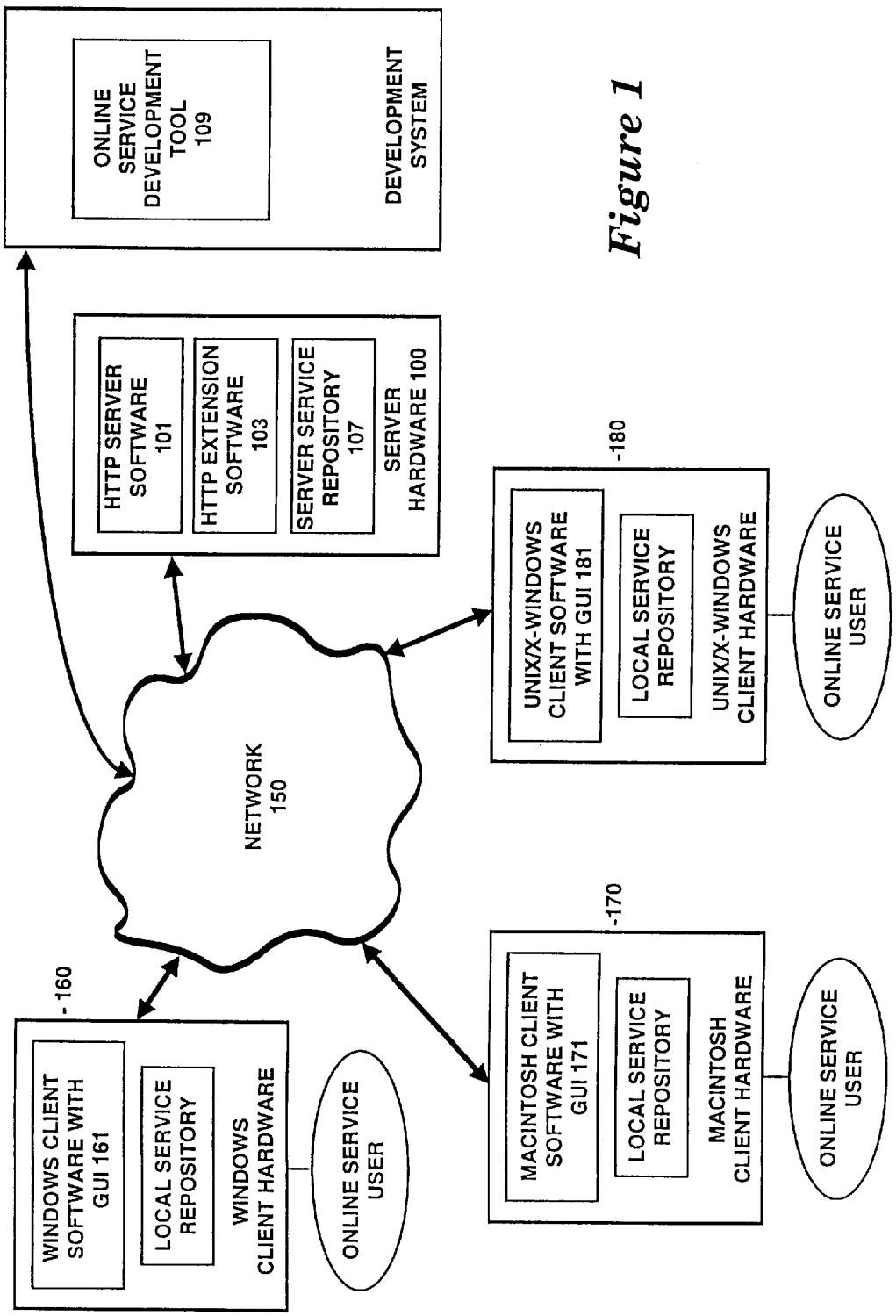
FIG. 1 illustrates a block diagram overview of an online service that is implemented with the Molisa platform.

The detailed descriptions which follow are presented largely in terms of algorithms and symbolic representations of operations within a computer system. These algorithmic descriptions and representations are the means used by those skilled in the data processing arts to convey the substance of their work most effectively to others skilled in the art.

Generally, and within the context of this application, an algorithm is conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar devices. In all cases, a distinction is maintained between the method of operations in operating a computer and the method of computation itself. The present invention relates to method steps for operating a computer in processing electrical or other physical signals (e.g., mechanical, chemical) to generate other desired physical signals.

The present invention also relates to apparatus for performing these operations. This apparatus may be specially constructed for the required purposes, or it may comprise a general purpose computer as selectively activated or reconfigured by a computer program stored in the computer. The algorithms presented herein are not inherently related to a particular computer or other apparatus. In particular, various general purpose machines may be used with programs written in accordance with the teachings herein, or it may prove more convenient to construct more specialized apparatus to perform the required method steps. The required structure for a variety of these machines will appear from the following description.

DETAILED DESCRIPTION OF AN EMBODIMENT OF THE PRESENT INVENTION

Methods and apparatus for implementing a development tool for creating online services are disclosed. In the following description, for purposes of explanation, specific nomenclature is set forth to provide a thorough understanding of the present invention. However, it will be apparent to one skilled in the art that these specific details are not required to practice the present invention. For example, the present invention is disclosed with specific reference to the HyperText Markup Language (HTML) and the HyperText Transfer Protocol (HTTP). However, the teachings of the present invention can easily be used with other hypertext document formats and other transport protocols.

Overview

The present invention provides a visually oriented software development tool for the design, construction and modification of online computer services. The development tool of the present invention allows a user to create online services using existing information sources such as databases, files, and applications that are external to the online service itself. An online computer service created with the development tool can offer the following options:

Search, view and edit information

Download, print or file information

Enable the information for commerce

Control access to the information

Examples of types of online services that can be built with development tool of the present invention include document viewing services, electronic commerce services, directory lookup services, classified advertisement services, reference services, electronic bulletin board systems, document retrieval services, electronic publishing services, an electronic service store for purchasing online services, and a global service-of-services that is used to locate and connect to other online services. To create commercial online services, the development tool of the present invention includes a sophisticated fee setting tool that levies of pays fees to users and content providers under defined conditions.

The online service development tool of the present invention is one part of a comprehensive architected platform for deploying distributed online services. The online services created with the development tool of the present invention utilize standardized Application Program Interfaces (API's) for communication between the various components. The overall platform architecture is referred to as the Modular Online Information Services Architecture, or Molisa. Molisa includes client software, server software, administrative software for recording and analyzing online service usage, and the online service development tool described in this document. The software components of the Molisa platform are hardware independent, and thus can be implemented on several different computer architectures.

The invention's design characteristics are described here in the context of its preferred embodiment, a development tool for the Molisa online services platform. The Molisa platform leverages existing HyperText Transfer Protocol (HTTP) based World-Wide Web servers, and Mosaic and other HTTP client browsers (with software extensions), on the global Internet. However, the design principles of the present invention are largely applicable to online services in other settings, including non-architected centralized online services, other decentralized online services, and services in which the client and server software reside on a single machine (such as CD-ROM based information services).

The Application Program Interfaces that define communication between the client software and server software are largely independent of the underlying transport protocol. For example, the development tool of the present invention does not require that the client and server computers communicate using HTTP or the underlying TCP/IP protocol. Any suitable transport protocol, across Local Area Networks (LAN's), Wide Area Networks (WAN's), dial-up or leased telephone lines, etc., may be used between the client hardware and the server hardware.

FIG. 1 illustrates a block diagram overview of an online service being used by three users that is implemented with the Molisa platform. A server hardware platform 100 comprises a general purpose computer system coupled to a communications network 150. The HTTP server software 101 and HTTP extension software 103 run on the server hardware platform 100. The HTTP server software 101 drives the online service using information stored within the service repository 107. The HTTP extension software 103 provides additional functionality for the online service that is not available in standard HTTP server software. For example, the HTTP extension software 103 might access a back end database.

An online service development tool 109 is used to create the data structures, documents, and scripts that are stored in the server service repository 107 and supply the HTTP extension software 103. The HTTP server software 101 accesses the data structures, documents, and scripts stored in the service repository 107 to implement an online service. Software for the development tool 109 is usually located on a development computer system that is coupled to the server system across a communications network 150 as illustrated in FIG. 1. Alternatively, software for the development tool 109 may run on the actual server computer system.

Each user accesses an online service created with the development tool 109 using compatible client software. In FIG. 1, three client hardware platforms: Windows® platform 160, Macintosh® platform 170, and UNIX®/X-Windows platform 180 are illustrated. Each different client hardware platform must have a copy of client browser software that is compatible with the HTTP server software 101 and the information stored within the service repository 107. Each client hardware platform may also have a local service repository. The local service repository at each client hardware platform contains information that is available locally to the user of the specific client hardware platform. The local service repository can also act as a cache to store information retrieved from the main service repository 107.

The communications network 150 couples the users running client software with the online service server software running on the server hardware. In the present embodiment, the communications network 150 is a packet switched network implemented using TCP/IP protocol. However, the communications network 150 could simply be the existing telephone network.

Using the Molisa platform as illustrated in FIG. 1, small and large service providers can run an online service using existing heterogeneous computer equipment and existing data in its original native form and location. Since the Molisa platform uses standardized well-defined Application Program Interfaces (API's), third parties can develop enhancements, extensions, or replacements for the client software, the server software, the metering software, or the online service development tool software.

Furthermore, the online service development tool software of the present invention is divided into several different subtools that each have well defined subtool Application Program Interfaces (API's). By having well defined subtool API's, third parties may create improved subtools to replace the original subtools. Alternatively, new subtools can be added to the development tool software to handle unforeseen development.

Electronic Commerce

The Molisa platform places a particular emphasis on commerce-enabling any information source that is electronically accessible. The Molisa platform uses the general steps illustrated in FIG. 2 for electronic commerce in an online service. Initially, the service user views general online information about goods or services that are external to the service, as stated in step 210. This is usually done using a hypermedia document that contains images and text describing the goods and services. Next, the user initiates an electronic transaction to download, price, purchase, rent, reserve, etc. the online hyperdocument itself or the goods/services that the hypermedia document information describes, as stated in step 220. In response to the user's action, the online service processes the electronic transaction initiated by the user, as stated in step 230. Using a Fee Computation defined in the Computation Language of the present invention, the online service may charge or pay a user or content provider as stated in step 240. Finally, the user views the results of the electronic transaction, by viewing the downloaded information, or by viewing a confirmation of the electronic transaction involving goods or services, as stated in step 250.

Figure 2:
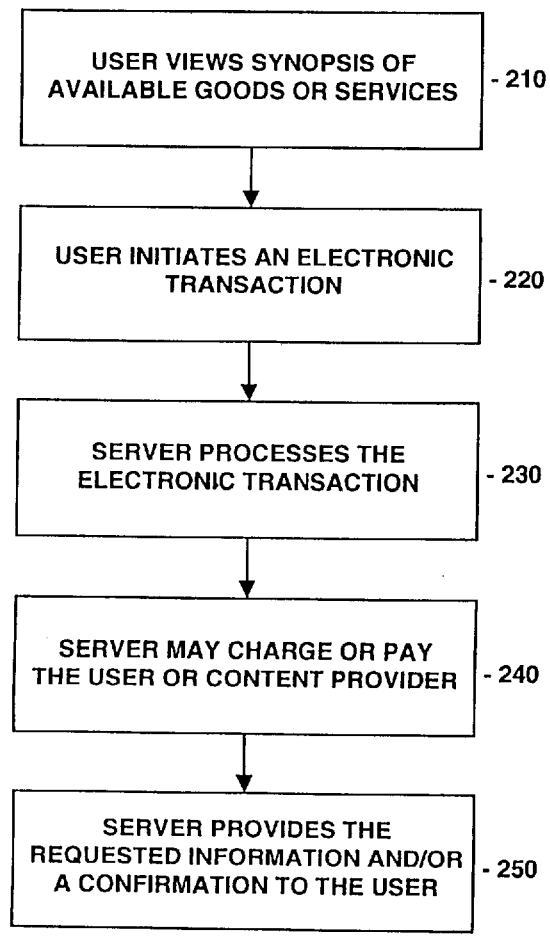
FIG. 2 lists the general steps for an electronic commerce transaction with an online service.

In the transaction model of FIG. 2, the notion of "transaction" can take several forms, and the development tool invention supports each of the following:

Real-time electronic transaction: A transaction can debit a user's account, check and subtract from inventory, mark an item as reserved, reference up-to-date online information, etc., all by immediately accessing the electronic databases that contain the relevant data. The invention supports such real-time transactions with a Script Language that provides direct access to any electronic databases that are accessible from the server.

Real-time manual transaction: For manual systems (e.g., a clerk checks inventory by looking in the back room, and then responds to the user in real-time), or electronic systems that are not accessible from the server computer, human intervention might be required to complete a transaction. The invention supports these transactions with Script Language primitives that allow for real-time cooperative activity between users and a representative of the online service provider.

Delayed electronic transaction: In certain cases, an online service may wish to queue a series of transactions for later batch processing. For example, an online service could queue all the transactions for a particular day and transmit all the transactions for that day during the night to save on long-distance telephone charges when dialing-up a remote computer. Alternatively, an online service may wish to issue a transaction against a computer that provides only electronic mail access. To support these delayed electronic transactions, the invention includes Script Language primitives that: (1) perform file input/output (to queue transaction requests), and (2) send/receive electronic mail to automatic agents on other computers.

Delayed manual transaction: Some online services can require manual transactions that do not occur in real-time. For example, an online service run by an antique dealer can allow users to submit bids for items advertised on the service, and the antique dealer can consider all received bids at the end of the business day. To support these transactions, the invention's Script Language includes primitives that can submit and receive electronic mail between the user and a representative of the service provider.

The use of examples will best illustrate how the development tool can be used to commerce-enable existing sources of electronic information. For example, the development tool can convert the digital source information used to create a printed catalog into a commerce enabled online service. The created online service displays the contents of the catalog on a user's display screen. A user can check the available stock and place an order for any item in the catalog. Also, for example, the development tool can convert a list of classified advertisements into an online service where advertised goods may be electronically reserved with a deposit or purchased outright. To update the electronic list of classified advertisements, users may electronically submit new advertisements to the online service for a set fee.

Another type of online service the development tool can create is a service that selects specific items from a collection of newsfeeds, based on a user's previously registered interests, and assembles a customized electronic newspaper for which the user is charged a fee. Payment for any transaction with any online service can be handled using secure, authenticated electronic transaction techniques as is well known in the art. Alternatively, other methods of payment such as credit card payment, electronic funds transfer, or external payment mechanisms (e.g., mailing a check) can be used.

To create online systems that are prepared for commerce, the online system development tool includes a Fee Setter for assigning fees and a sophisticated Script Language for creating scripts that control commerce transactions. The online system development tool of the invention embodiment is referred to as the Online Designer. The Online Designer is a visual editing system that allows a developer to create online services using graphical screen displays and cursor control device such as a mouse. The Online Designer is composed of several distinct, cooperating, visually compatible subtools. Although some of the Online Designer subtools are implemented as separate programs, all of the Online Designer subtools appear to the user as an integral part of the Online Designer, and are described here as such.

The Online Designer online system development tool can be used to create sophisticated, yet easy-to-use online services. Some of the features of an online service designed using the Online Designer development tool include:

Display of "hypermedia" documents: Hypermedia documents present text, images, video, and/or sound to a user of the online service. Hypermedia documents may function as on-screen input forms by including visual objects for user input: text fields, checkboxes, option buttons, command buttons, and drop-down list boxes. In the present embodiment, the hypermedia document format supported by Online Designer is the HyperText Markup Language (HTML). HTML is the HyperText format supported by HTTP servers comprising the World-Wide Web (WWW) on the global Internet.

Display of portable documents: Portable documents preserve the exact printed appearance of a document (fonts, illustrations, etc.), and can be viewed on different hardware and software platforms. A portable document can be generated by any software application that supports printing. A specially designed print driver converts the printer commands into the portable document format. Examples of portable document formats include Acrobat® by Adobe of Mountain View, Calif. and WordPerfect® Envoy by WordPerfect Corporation of Orem, Utah. The portable document may be viewed on a workstation display screen as part of an online service. Collectively, hypermedia documents and portable documents are referred to in this document as "hyperdocuments."

Support for "hyperlinks": Hyperlinks are visual buttons, images, or highlighted text that are associated with other documents, images, sound clips, video clips, or other online services. To move to the associated object, a user selects a "hotspot" with a cursor control device or chooses the hyperlink with the computer keyboard. Hyperlinks appear within hyperdocuments.

Support for full-text index/search/retrieval: Allows for quick search through large collections of online documents. The user can specify the search criteria using an appropriately designed hypermedia input form.

Attribute-based searching: A user may search through documents by specifying various document attributes such as the date of the last update, the size of the document, the size of the fee for downloading the document, etc.

Downloading data or programs: Allows data or programs to be downloaded from the online service to the local client computer system. Downloaded data or programs can later be executed, viewed, printed, or filed at the local client system.

Support for communication between different online services: Service-to-Service Protocol is a communication protocol whereby different online services can communicate information. Using the Service-to-Service protocol of the present invention, an online service can: (1) transfer control to another online service; (2) act on behalf of the user to query or update another online service; (3) automatically update another online service without user initiation; (4) appear to be seamlessly part of another online service; (5) keep a record of how many times users traverse to another online service; (6) pass along automatic user registration data to another online service; (7) automatically register a new online service with a service-of-services or "yellow pages" service; (8) check whether another server is running a particular online service or type of service; and (9) exchange usage and metering information, for aggregation and later analysis.

Support for an Online Designer Script Language: The Online Designer supports two different types of scripts: Event Scripts and Function Scripts. An Event Script is associated with a particular event for a particular visual object in the online service. For example, there could be an Event Script associated with a "Mouse Down" event for a "Search" button on a "ListingQueryForm" hypermedia document in an electronic "white pages" service. The event script associated with the mouse-down event would specify how to convert the user input fields on the "ListingQueryForm" form into a query for the text search/retrieval engine on the server. In general, there can be several Event Scripts associated with a single visual object, potentially one script for each type of event that is defined for that visual object. A Function Script contains a single named function (subroutine) that can be shared and invoked by multiple other scripts in the same service.

Launching and control of other software applications: These capabilities are achieved using inter-application communication techniques such as Windows DDE, Windows OLE, OpenDoc, keystroke stuffing, terminal emulation, command-line invocation, batch file invocation, and the like. For example, an online service can compute the quantity discount for a catalog item by automatically launching a spreadsheet program, plugging the item number and quantity into certain prearranged spreadsheet cells, invoking a spreadsheet macro to compute the discount, and obtaining the item price from a prearranged result cell. Other examples include launching and controlling applications for payroll, inventory, purchasing, and Manufacturing Resources Planning (MRP).

Directly and transparently accessing real-time data sources: Structured Query Language (SQL), Open Database Connectivity (ODBC), and other published and proprietary data access methods can be used to access real time data sources. For example, a catalog shopping online service can check the available stock on a certain merchandise item by issuing an appropriate SQL query to the inventory database. The inventory database would return the information to the online service software such that the online service could provide the information to the user or perform an electronic transaction.

Accessing and manipulating control equipment: Equipment such as heating/ventilation/air-conditioning systems, security systems, and lighting can be accessed and controlled.

Replication of online service content: The service's content and structure can be replicated to other online services on-demand or on an automatic, regularly scheduled basis.

Metering of user usage patterns for the online service: This can include the number of users who access the service, the duration of each user's connection time, the number of times that a certain part of the service is accessed, the number of times that a user was "referred" to this service by hyperlinking from another service, etc. This data can be used to levy fees for users, advertisers, or information providers, or to tune the service itself.

Controlling access to information: The available information on an online service can be controlled utilizing passwords, encryption, and assigning specific access rights to specific users.

Real-time cooperative activity: Support of real-time cooperative activity between two or more users, or between users and a representative of the online service provider. For example, a multi-person game between users, or a user entering an online query and receiving a real-time response from a service representative.

Capturing and Editing Images: Allowing a user or service operator to capture an image to be displayed as part of an online service (for example, a logo for a "yellow pages" directory listing, or a photograph to accompany an online classified advertisement), by faxing an image directly to the server, sending an image to the server using electronic mail, or scanning an image at the client workstation and electronically transmitting the image to the server. If a user does not have access to facsimile or scanning equipment, the user may physically send or deliver the photograph or graphic to a service operator, who will electronically capture the image on behalf of the user and transmit the image to the online service server.

Building an electronic service store: Allows a user to download entire online services (the structure and/or content), usually for a fee. The user can then deploy those services on the user's own computer equipment.

Searching and connecting to other online services: Allows a user to access a service-of-services which will search and connect to other online services.

The Online Designer Subservices

Using the Online Designer, a user (referred to here as the online service "developer") can develop one or more online services using a graphical editor. Each online service consists of one or more types of "subservices." Each subservice is a server program for handling a particular type of online service user interaction. Each subservice program has an associated database that stores the information that can be provided to the user and a set of scripts for handling events.

Figure 3A:
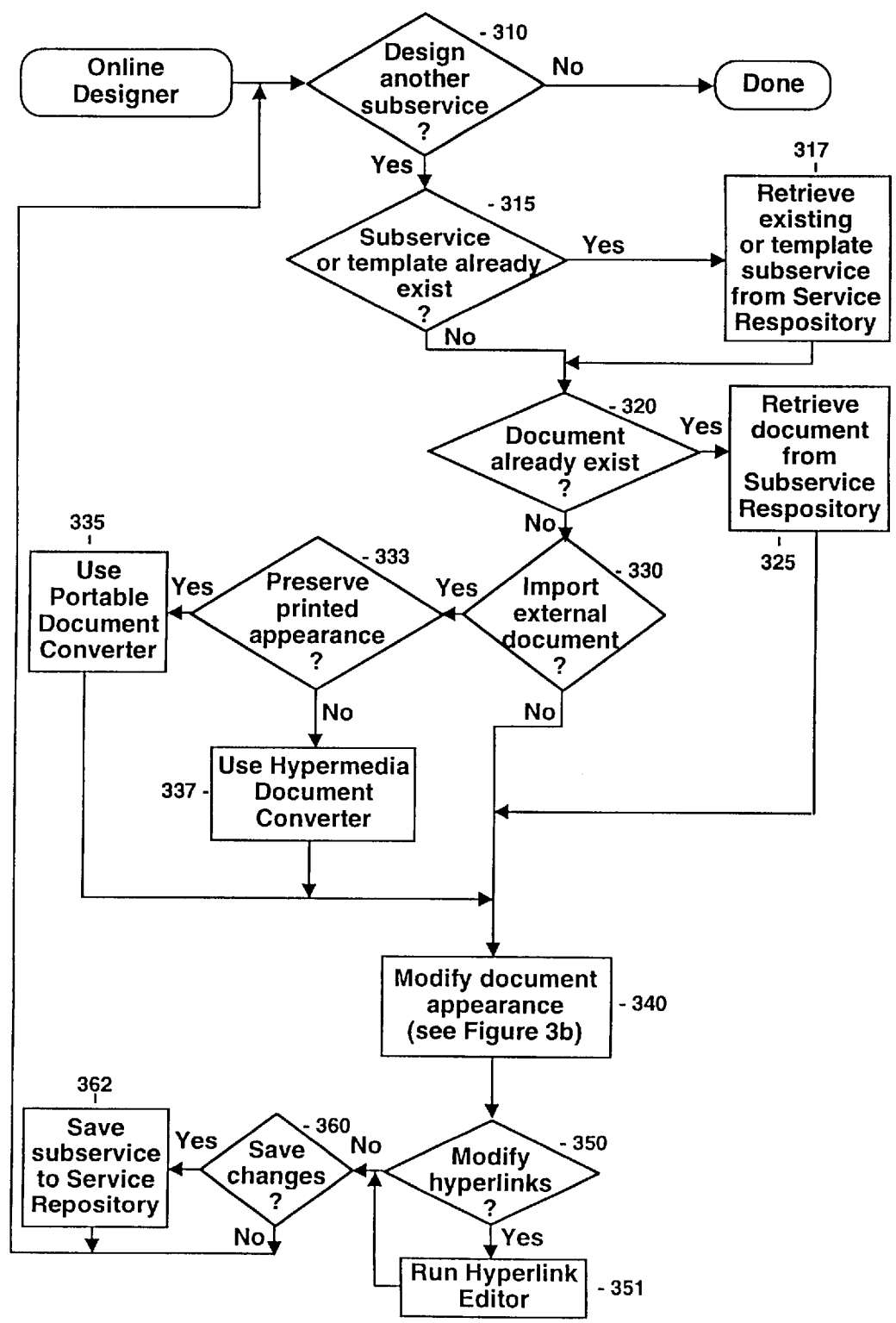
FIG. 3a illustrates how the Online Designer is used to create an online service.
Figure 3B:
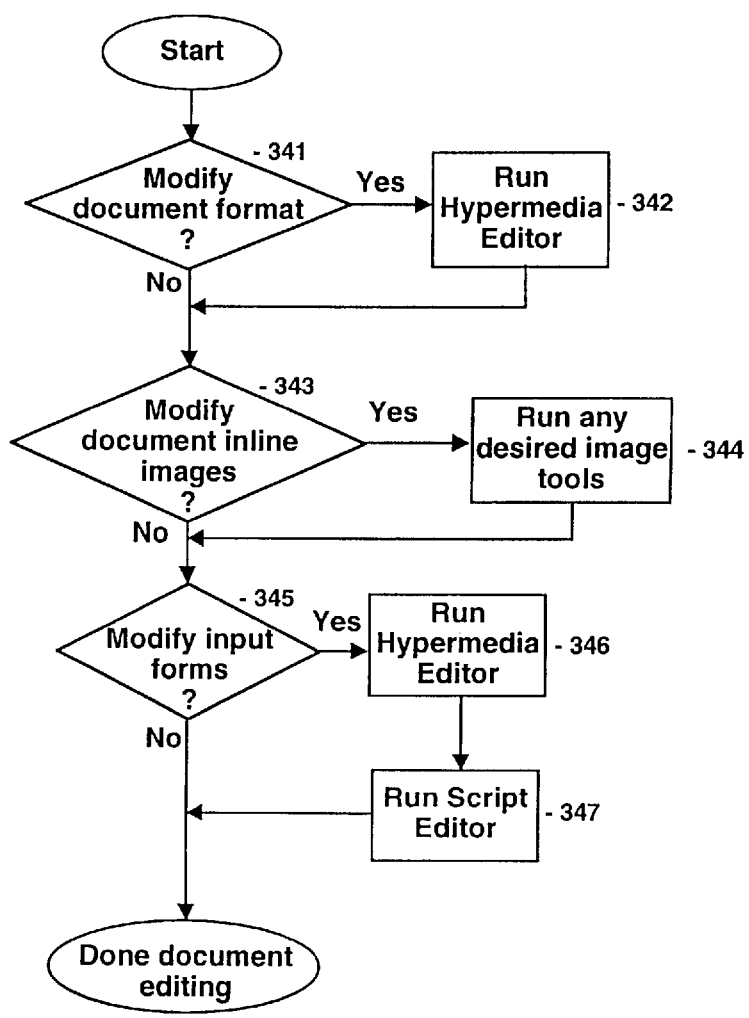
FIG. 3b illustrates how a hyperdocument is edited using the Online Designer.

FIGS. 3a and 3b illustrate how the Online Designer is used to create a set of subservices that comprise an online service. First, at step 310 user decides if another subservice should be created or edited, if not, then the online service is complete. When creating a new subservice, the developer may retrieve an existing sample subservice to start from as stated at step 315. At steps 320 and 325, the developer loads in an existing subservice document. If no document (database) exists for the new subservice, the developer can import an existing document. If the developer wants to preserve the printed appearance of the existing document, the Portable Document Converter is used as stated at step 335, otherwise the Hypermedia Document Converter is used at step 337. The developer then edits the subservice by editing the associated document (database) at step 340.

FIG. 3b illustrates, in detail, how a document can be edited using the Online Designer. The Hypermedia Editor is used to modify the appearance of the document at step 342. The Hypermedia Editor cannot be used if the document is a portable document. Any inline images can be edited using third party image design tools such as paint programs at step 344. The interactive elements of a subservice are edited by creating input forms with the Hypermedia Editor at step 346, and creating event scripts that process the input using the script editor at step 347.

Referring back to FIG. 3a, the hyperlinks within a document and to other online services or subservices can be created and edited using the Hyperlink Editor at step 351. Finally, the developer can save the created subservice for the online service at step 362.

The Online Designer includes specific Designer Subtools for designing each different type of subservice. In general, an online service may include more than one subservice of the same type or of different types. The following nine types of subservices are examples of subservices supported by the Online Designer: Hyperdocument/Commerce, Directory Lookup, Classified Advertisement, Reference, Bulletin Board, Document Retrieval, Electronic Publishing, and Meta-Service. Additional types of subservices can be added later.

Figure 4:
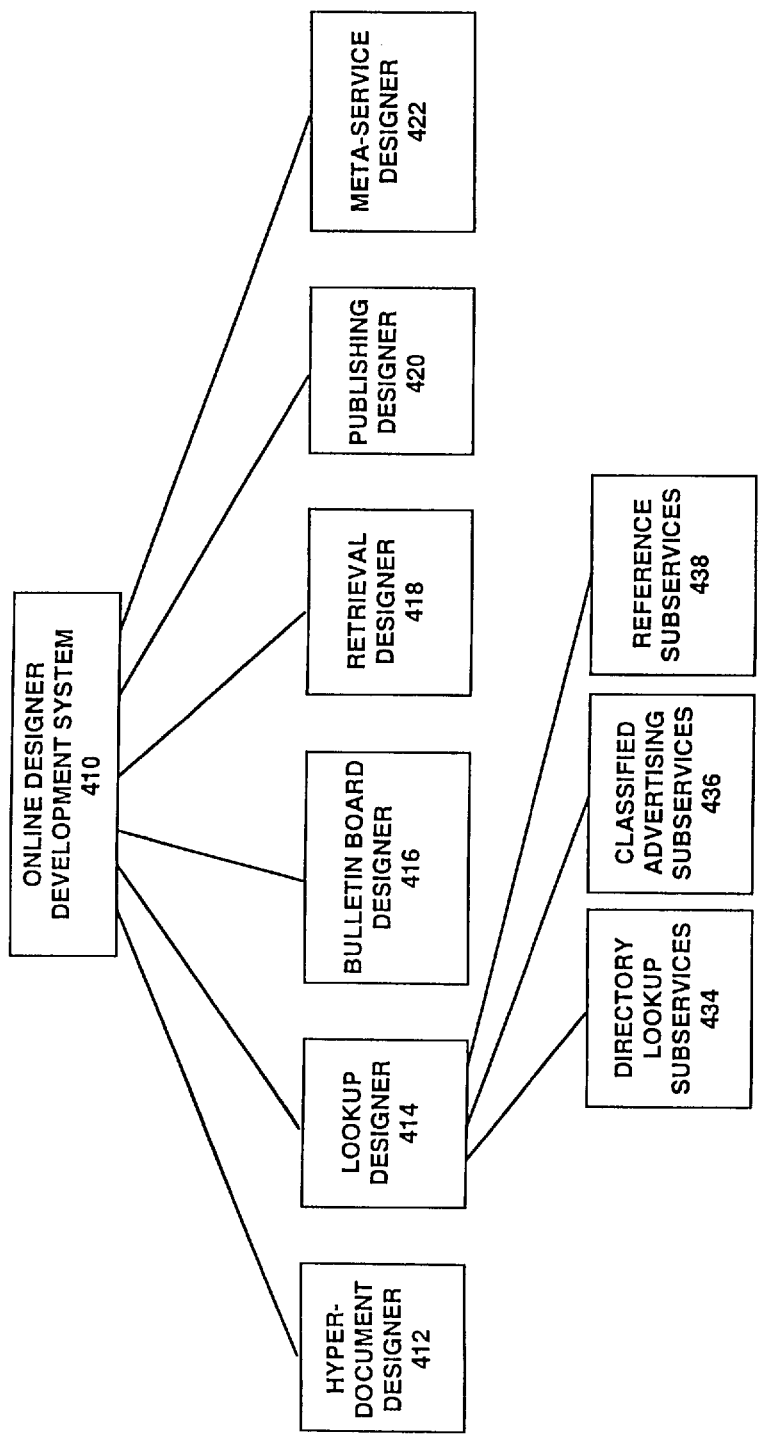
FIG. 4 lists the available subservice design programs.

FIG. 4 illustrates a block diagram of all the subservice designer tools of the Online Designer. More subservice design tools can be added in the future. As illustrated in FIG. 4, the Lookup Designer 414 is used to design Directory Lookup subservices, Classified Advertisement subservices, and Reference subservices since these three types of subservices share many similarities.

Hyperdocument/Commerce Subservice

Referring to FIG. 4, the Hyperdocument Designer 412 is used to design Hyperdocument/Commerce subservices. A Hyperdocument/Commerce subservice displays hypermedia information to a user of an online service. A Hyperdocument/Commerce subservice can optionally allow a user to purchase goods or services described by the displayed hypermedia information. Hyperlinks and full-text searches allow the user to move through the different hyperdocuments that comprise a Hyperdocument/Commerce subservice.

An example of a Hyperdocument/Commerce subservice is an electronic shopping system, where the user views an online catalog of goods or services and potentially submits an electronic order for goods. The user's electronic order is processed by an event script associated with the Hyperdocument/Commerce subservice. The Hyperdocument/Commerce subservice can also be used to display online documentation or help.

Directory Lookup Subservice

Referring to FIG. 4, the Lookup Designer 414 is used to design Directory Lookup subservices. A Directory Lookup subservice provides an online, searchable directory of information. For example, a Directory Lookup subservice can store a directory of persons, companies, or other entities. Each entry in the directory can list a name, an address, and any other related information; essentially, an online implementation of telephone "white pages" listings. Alternatively, the entries in a directory can be hyperdocuments that include company descriptions and advertisements, and can be arranged in categories, much like conventional telephone book "yellow pages" listings. In either case, entries are searchable by name, by category, or using full-text search techniques with user-specified keywords.

Each directory entry can optionally provide hyperlinks to other entries. Furthermore, each entry can contain a hyperlink to a dedicated online service that provides additional information about the entry. Using the directory subservice, qualified users can submit new entries, which immediately become available for retrieval in subsequent searches of the directory subservice by other users.

Classified Advertisement Subservice

Referring to FIG. 4, the Lookup Designer 414 is also used to design Classified Advertisement subservices. A Classified Advertisement subservice implements an online version of classified advertisements. Users can search existing classified advertisement listings. Classified advertisement submissions are searchable by category, geographical area, the name of the submitter, or using full-text search techniques with user-specified keywords. Furthermore, end users can submit new classified advertisement listings of their own. The online service can charge a fee for submitting a new classified advertisement.

Reference Subservice

Referring to FIG. 4, the Lookup Designer 414 is also used to design Reference subservices. A Reference subservice implements an online reference work, such as a dictionary, thesaurus, or encyclopedia. A user can search the contents of a Reference subservice by the name of the entry, or using full-text search techniques with user-specified keywords. The online service provider controls the content of a Reference subservice. However, the online service allows the user to submit additional personal entries that are seamlessly integrated into the subservice, but are only seen by that user. These personal entries can be stored within the service repository of the client hardware system.

Bulletin Board Subservice

Referring to FIG. 4, the Bulletin Board Designer 416 is used to design Bulletin Board subservices. A Bulletin Board subservice provides a means for allowing users to post and view messages about a particular topic. Users may read and search through the existing messages. A user may reply to an existing message, or reply to a reply, thus creating a "conversation thread" from an original message.

The messages are divided into different sections. Messages within a given section conform to a submission form designed for that section by the online service developer. The submission form can contain various data fields that are specific to that message section, in addition to a text input area on the form for typing the message to be posted. The developer also specifies which message data fields should appear in the summary view for each bulletin board section. The summary view lists the relevant header information for the messages in that section.

Document Retrieval Subservice

Referring to FIG. 4, the Retrieval Designer 418 is used to design Document Retrieval subservices. A document Retrieval subservice provides a means for users to retrieve documents and other files such as word processing documents, spreadsheets, text files, databases, images, sound files, video files, executables, etc. Users can find such documents using full-text search techniques with user-specified keywords, for those document types that can be viewed as text. Users can also find documents by category and subcategory, when hierarchical browsing is supported by the online service. A document Retrieval service can be used to provide searchable access to a large corpus of text, to make files on a file server available to geographically remote offices within a company, or to provide software updates to customers.

Electronic Publishing Subservice

Referring to FIG. 4, the Publishing Designer 420 is used to design electronic Publishing subservices. An Electronic Publishing subservice provides a user with an electronic edition of a newspaper or magazine that the user may download to the user's local client hardware. An Electronic Publishing subservice can create a customized daily newspaper, that provides only news stories that match certain criteria provided previously by the user. Downloaded material may take the form of static documents, or hyper-media documents with images, sound, video, and hyperlinks to move through the hypermedia document.

Meta-Service Subservice

Referring to FIG. 4, the Meta-Service Designer 422 is used to design Meta-Service subservices. A Meta-Service subservice provides a service-of-services that is designed specifically to help a user find another online service. Using the Meta-Service subservice, a user can look for another online service, using keyword searches, categories, alphabetic listings, etc. An online service listing can include a description of the online service, the categories to which the online service belongs, and a visual icon for the online service. Once the user finds a desired online service, the meta-service provides a direct connection to the online service. A Meta-Service subservice can itself lead to other meta-service subservices, in a hierarchical or network fashion.

Hyperdocument/Commerce Subservice

In a common use for the invention, a Hyperdocument/Commerce subservice will be combined with other subservices to commerce-enable those other subservices.

Figure 5:
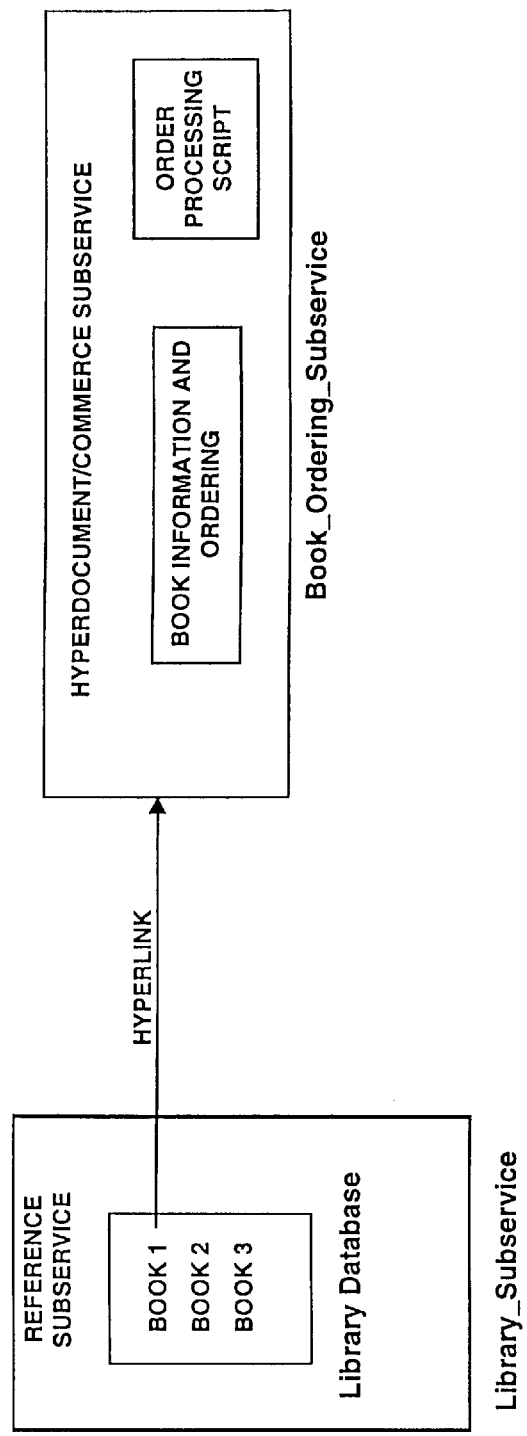
FIG. 5 illustrates a hyperlink from a Reference subservice to an order form in a Hyperdocument/Commerce subservice.

For example, an online service that includes a Reference subservice that allows the user to peruse the current Books In Print can also include a Hyperdocument/Commerce subservice to enable books to be reserved or purchased. This is illustrated in FIG. 5, in which a Reference subservice containing book descriptions has a particular book reference with a hyperlink. When viewing a particular book entry in the Reference subservice, the user clicks a button on that book entry to transfer directly to the Hyperdocument/Commerce subservice. The Hyperdocument/Commerce subservice will be invoked to display an on-screen order form so the end user can buy the book. The user types the necessary ordering information into the order form and transmits the information. The Hyperdocument/Commerce subservice contains a script for processing the information entered on the on-screen order form.

Figure 6:
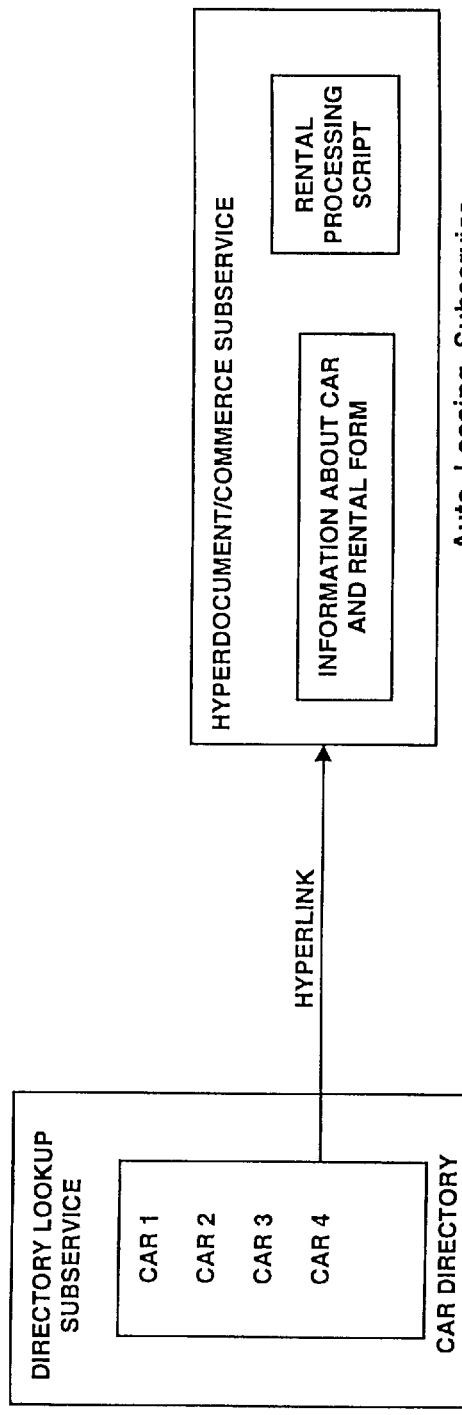
FIG. 6 illustrates a hyperlink from a Directory Lookup subservice to an rental form in a Hyperdocument/Commerce subservice.

A second electronic commerce example is provided with reference to FIG. 6. FIG. 6 illustrates an automobile rental agent's use of the Online Designer to create and deploy an online service that includes a Directory Lookup subservice that displays information about the available cars to rent. If a user selects a particular car from the Directory Lookup subservice, then the online service transfers control to a Hyperdocument/Commerce subservice that displays an automobile rental form to the user. To rent the car, the user fills in the on-screen form. The information entered into the on-screen form is processed by a script in the subservice electronically transmitted to the automobile rental agency.

The Online Designer makes a distinction between the "framework", the "structure", and the "content" of an online service. The "framework" is the architected online services platform Molisa for which Online Designer develops online services. The Molisa framework provides the domain independent infrastructure and includes the Online Designer, the subservice programs created with the Online Designer, the documents created with the Online Designer for use by the subservices, and the client software used to access the online service created with the Online Designer.

The "structure" of an online service is composed of those portions of the service that define its behavior. Classified advertisement classifications, a bulletin board submission form, and hyperlink attributes are examples of the components that comprise the structure of an online service. The structure includes the selected subservices and how the selected subservices are connected together.

The "content" of an online service is the information that the each of the subservices delivers to users. Some of the content of an online service can be static, provided by the developer when the online service is designed; and some of the content can be dynamic, provided by the developer or other users at run-time without requiring further online service design work. Examples of static content includes the screen displays for different regions of an online service. Examples of dynamic content includes bulletin board messages written by users and classified advertisements submitted by users.

Hyperdocuments are sometimes part of the structure of an online service, and sometimes part of the content. For the purposes of Online Designer, a hyperdocument is considered part of the service's structure if it is in a Hyperdocument/Commerce subservice, or if it is a form. Otherwise, the hyperdocument is considered a part of the service's content if the hyperdocument is displayed in any other type of subservice.

Using the Online Designer, a developer can create "templates" for the structure and/or content of an online service, in addition to developing entire online services. A "structure template" is a partially developed online service structure, whose development can be easily completed by developers who provide the missing details to create a fully functional and customized online service. Similarly, a "content template" is a partially developed content module for an online service. Templates can be separately packaged and provided to other developers to expedite the development of online services using Online Designer.

The structure and content of an online service are stored in the Service Repository. The Service Repository is a database system that is potentially distributed between the client workstation and one or more servers, depending on the design of the particular online service. When the data is distributed, it still appears to the developer and user as a seamless whole. Each Online Designer subtool stores the data for its subservice in the Service Repository, and the various Utility Subtools access data from the repository for a single subservice or multiple subservices.

The Online Designer includes replication support for the Service Repository itself. This is useful in cases where the developer's workstation does not have full-time direct access to the Service Repository for a certain online service. For example, this can occur if the service was originally developed by another person. In such cases, Online Designer can replicate the components of the online service from the server where the service resides down to the developer's workstation, and then replicate the components back to the server when the modifications are complete.

There can also be more than one developer who regularly maintains an online service. In such cases, it becomes important to prevent multiple developers from modifying the same part of the service simultaneously, because one developer's work will overwrite another when the changes are replicated back to the server. To address this issue, Online Designer supports version control techniques, as known in the art, allowing a developer to "check out" a service component for modification. When checked-out, the component may be viewed but not modified by any other developer until the component is later "checked-in" by the developer who checked it out.

Online Designer Utility Subtools

The Online Designer tool provides the organizational structure for developing online services. It also provides access to the various subtools that allow the developer to design the details of online services. Online Designer includes specific Designer Subtools for each type of subservice. The various Utility Subtools are accessible directly from the Online Designer tool, as well as from those Designer Subtools that apply.

Figure 7:
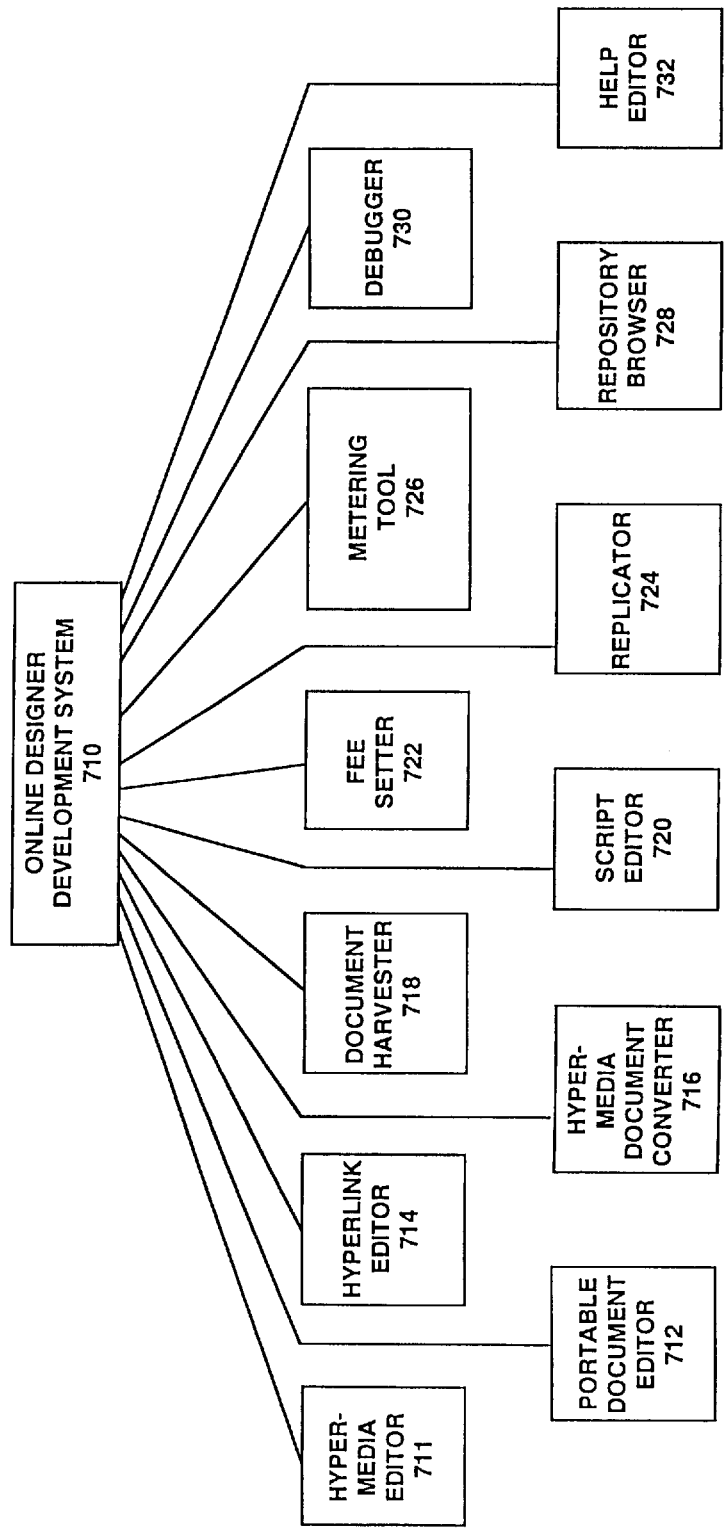
FIG. 7 illustrates the set of Utility Subtools in the Online Designer development tool.

FIG. 7 illustrates a block diagram of the Utility Subtools. The list of Utility Subtools that support Online Designer and the Designer Subtools include a Hypermedia Editor 711, a Portable Document Editor 712, a Hyperlink Editor 714, a Hypermedia Document Converter 716, a Document Harvester 718, a Script Editor 720, a Fee Setter 722, a Replicator 724, a Metering Tool 726, a Repository Browser 728, a Debugger 730, and a Help Editor 732. A description of each utility subtool is hereby provided.

Hypermedia Editor

The Hypermedia Editor 711 is a What-You-See-Is-What-You-Get (WYSIWYG) visual editor for creating and editing hypermedia documents. The Hypermedia Editor 711 can edit text, visual elements, sound elements, user-input objects, and hotspots for hyperlinks within hypermedia documents. FIG. 3b illustrates how the Hypermedia Editor 711 can be used to lay out user input forms for the various types of subservices that require user input. In the described embodiment, the Hypermedia Editor is used to create and modify documents in the HyperText Markup Language (HTML) format. However, any other hypermedia format can also be supported.

Portable Document Editor

The Portable Document Editor 712 is a visual editor for adding hyperlink button hotspots to portable documents. Since portable documents preserve the exact printed appearance of a page, the portable document format is inherently less flexible for on-screen viewing than the format of a hypermedia documents. Thus, only hyperlink buttons can be added to portable documents. For situations where video, sound, or user input are required, the online service developer should use a hypermedia document instead of a portable document.

Hyperlink Editor

The Hyperlink Editor 714 is a tool that displays and manipulates hyperlinks within an online service. The Hyperlink Editor is described in greater detail in a dedicated subsection, below.

Hypermedia Document Converter

The Hypermedia Document Converter 716 is a Conversion tool that translates documents from various document file formats into a hypermedia document format supported by the Online Designer. For example, the Hypermedia Document Converter can convert various word processor files into HTML files. Once a document is in a hypermedia document format such as HTML, the hypermedia document format can be edited with the Hypermedia Editor 711.

Portable Document Converter

The Portable Document Converter is a conversion tool that translates documents from various document file formats into the portable document format supported by the Online Designer. For example, the Portable Document Converter may translate a Postscript® file into a portable document format supported by the Online Designer.

Document Harvester

The Document Harvester 718 is a visual tool for specifying which files, directories, and volumes should be indexed for full-text search and retrieval. The Document Harvester displays the file/directory/volume entities in a graphical tree structure such that a developer can specify particular entities for indexing using a cursor control device. In a similar fashion, the developer can specify which specific users or groups of users have the right to access which entities.

Script Editor

The Script Editor 720 is a visual editor for creating and editing the Event Scripts and Function Scripts of an online service. The Script Editor is described in greater detail a dedicated subsection, below. To facilitate quick development of an online system, many sample scripts for many application domains are provided with the Online Designer.

Fee Setter

The Fee Setter 722 is a subtool that specifies how usage fees (if any) should be levied and paid to content providers and users, based on usage of the online service. For example, users can be charged to access information and advertisers can be charged to place advertisements on an online service. The Fee Setter 722 sets fees based upon the usage of the online service. The Fee Setter 722 is the principal subject of this document, and is described in greater detail in a dedicated subsection, below.

Replicator

The Replicator 724 is a subtool that specifies the replication behavior of the content and structure of various subservices. A given subservice may be replicated on multiple servers. Using the Replicator 724, the online service developer can specify: (1) the other servers that participate in replication, (2) which server is the "tie-breaker" when changes on multiple servers conflict, (3) how often a subservice replicates, and (4) whether the subservice content, structure, or both are included in the replication.

Metering Tool

The Metering Tool 726 is a subtool that allows the developer to specify the particular online service usage data that the server should gather. The Metering Tool 726 is described in more detail in its own subsection, below.

Repository Browser

The Repository Browser 728 is a subtool that lists all of the services, subservices, documents, scripts, and other stored resources in the Service Repository, the database associated with the Online Designer. The developer can see the computer disk storage locations for each of these elements, and the amount of disk space occupied. The Repository Browser 728 provides support for moving, copying, and deleting elements within the Service Repository.

Debugger

The Debugger 730 is a subtool that allows the developer to run and debug an online service while the online service is still under development. The Debugger 730 is described in greater detail in its own subsection, below.

Help Editor

The Help Editor 732 is a tool for the developer to author online help for an online service, to be accessed by users. The help information may be context-sensitive such that when the user presses a specific help key or clicks on a specific help icon, the online service will display appropriate help information for the specific task that the user is attempting to perform. In addition, a general help table of contents and a keyword lookup facility is available for users to search the available help documentation.

In the preferred embodiment, the Online Designer and the related subtools all use similar user interface paradigms, including menus, toolbars, keystroke shortcuts, and mouse techniques such as double-clicking and drag-and-drop. All the design tools also support standard cut, copy, paste, and delete techniques as are well known in the art. For purposes of illustration in what follows, one particular user interface embodiment will be disclosed for demonstrating certain features of the invention. However, it should be understood that the same features can be made accessible using other user interface embodiments. For example, a certain feature can be available both from a pull-down menu and from a toolbar.

Example Online Service

Figure 8:
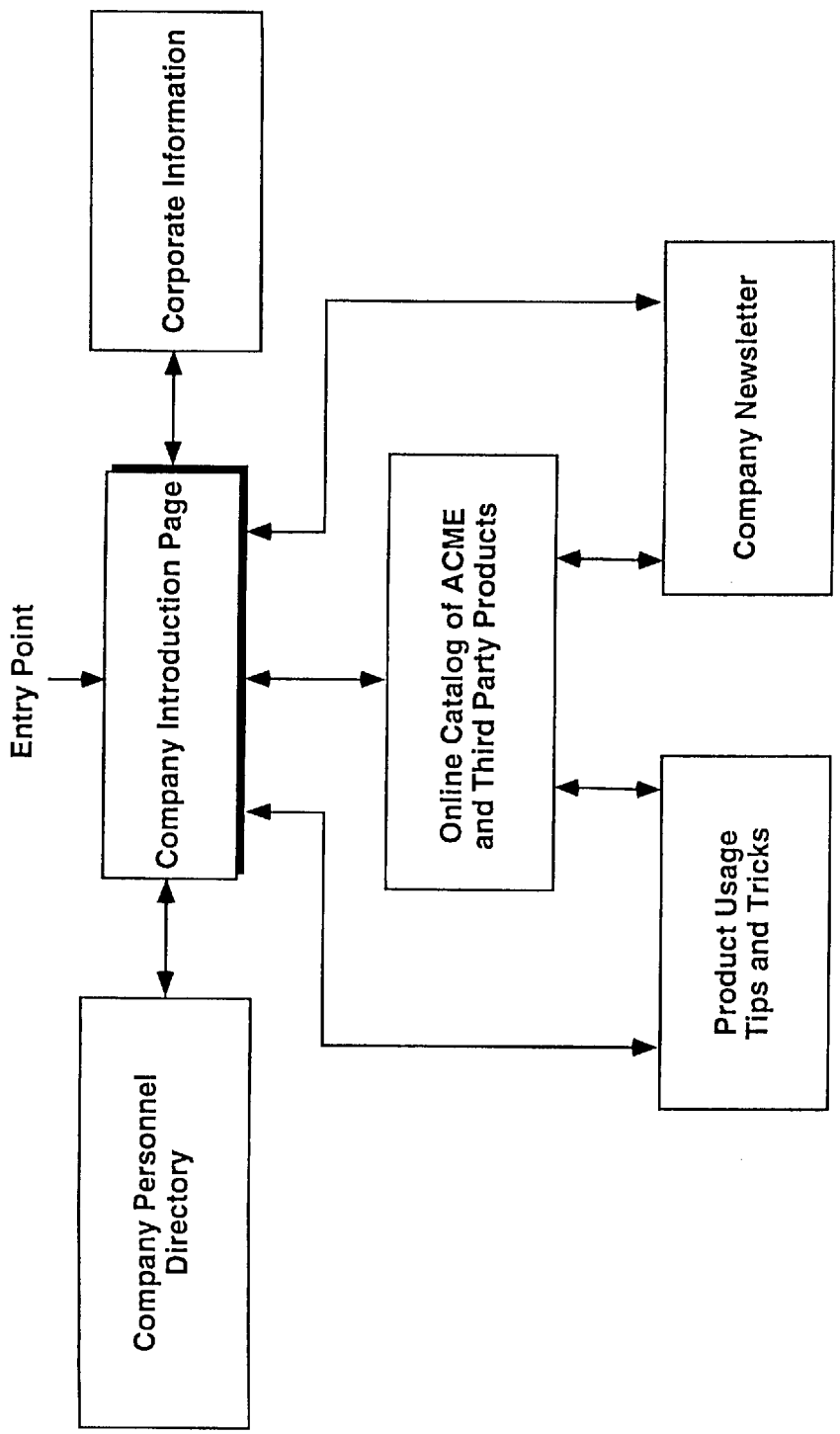
FIG. 8 illustrates a block diagram example of an online service.

FIG. 8 illustrates a block diagram example of an online service that can be created with the Online Designer. The online service illustrated in FIG. 8 will be used as the basis for a series of examples throughout this document.

The online service structure of FIG. 8 initially shows the user an introductory page for the company. From the introductory page, a user can go to a company personnel directory, a catalog of products made by the company, a list of tips and tricks for using the company's products, a company newsletter, and a listing of corporate information. The example online service illustrated in FIG. 8 can be used as a template for any company that wants to quickly create an online service for its customers.

Figure 9:
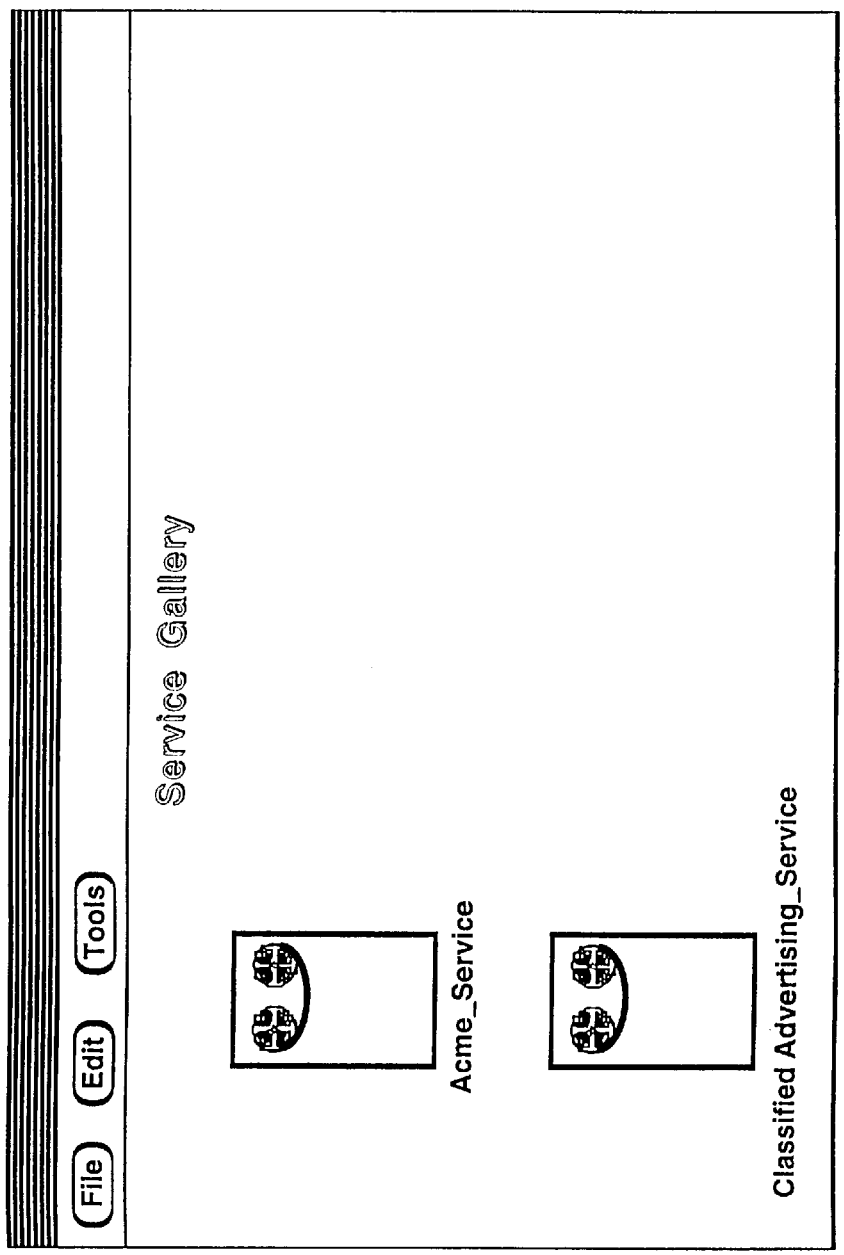
FIG. 9 illustrates a service gallery containing online services that may be edited.

When the Online Designer is initially invoked, it displays the Service Gallery, which shows all existing online services that are available for modification. FIG. 9 illustrates how the Service Gallery appears to a developer. Each online service is represented by an icon, with the name of the online service displayed beneath. From this screen display, the developer can cut, copy, paste, and delete entire online services.

To "open" an existing online service, the developer double-clicks with the mouse on the icon for the desired online service. This action opens a Service Window, which displays the components of that service. There are four "views" for a Service Window: Connectivity View, Script View, Link View, and Fee View. The initial view for a Service Window is the Connectivity View. To switch between the views, the developer chooses the appropriate pull-down menu item or clicks on the appropriate button on a Service Window toolbar.

Figure 10:
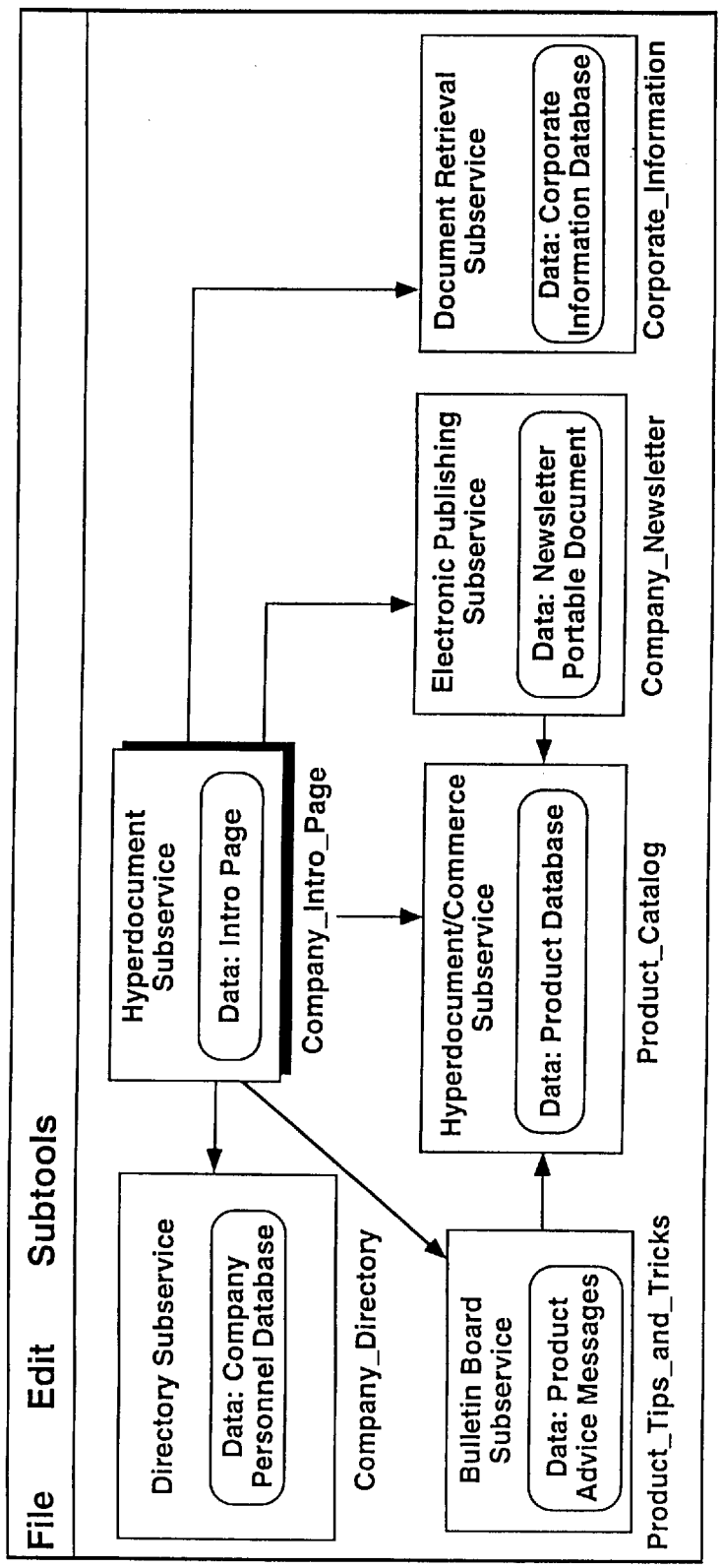
FIG. 10 illustrates a Connectivity View of the online service of FIG. 8.

The Connectivity View of the Service Window for an online service displays all of the subservices, data sources, and content corpuses that comprise the online service. The Connectivity View also illustrates hyperlinks to other external online services to which this online service connects. For example, FIG. 10 illustrates a Connectivity View for the online service of FIG. 8. As illustrated in FIG. 10, each subservice is displayed with the name of the element subservice beneath.

From the Connectivity View, the developer can cut, copy, paste, and delete entire subservices. The developer can change the data sources (SQL databases, ODBC databases, CD ROM databases, server-based files, data on the local client workstation, etc.) for each subservice; change which content corpuses the service uses within those data sources; and change the hyperlink connections to other online services, including access to all features of the invention's Service-to-Service Protocol. For data sources, the developer can specify and modify the necessary logon information and other parameters necessary for accessing the data.

Figure 13:
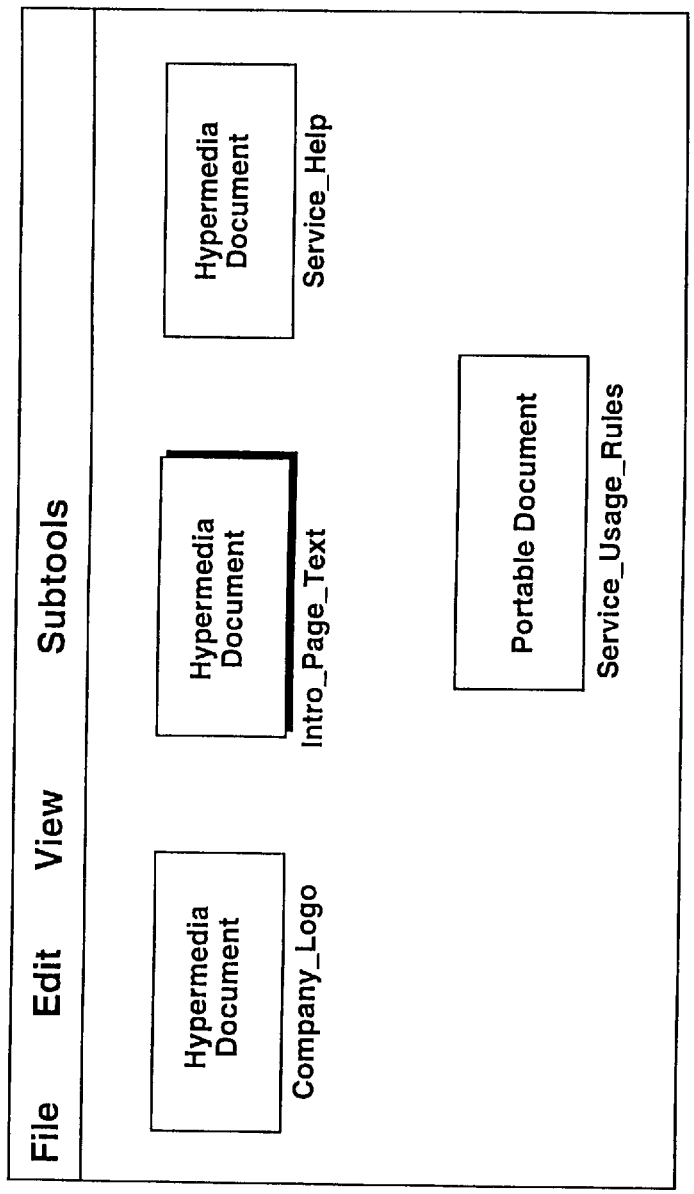
FIG. 13 illustrates a hyperlink view of a hyperdocument.

From the Connectivity View, the developer can double-click on a subservice icon to edit that subservice. Double-clicking on a subservice icon invokes the design tool for that particular type of subservice. For example, double-clicking on the Hyperdocument/Commerce subservice icon for the Company Introduction Page invokes the Hyperdocument Designer tool. FIG. 13 illustrates how the internal structure of the hyperdocument for the Company Introduction Page may appear. As illustrated in FIG. 13, the Hyperdocument Designer tool provides access to the hypermedia documents that comprise the Company Introduction Page Hyperdocument subservice.

Figure 11:
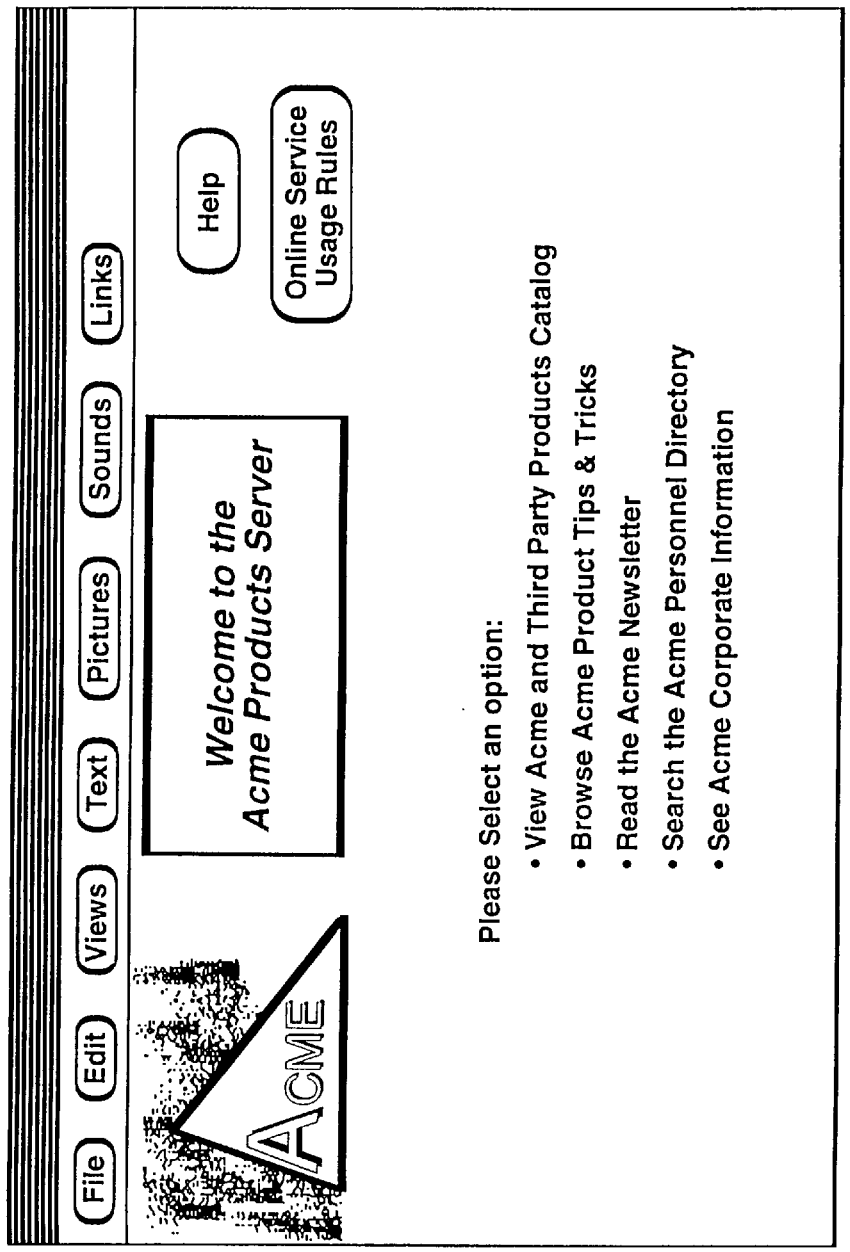
FIG. 11 illustrates a WYSIWYG view of a hypermedia document.

Double-clicking on a hypermedia document (shown in FIG. 13) invokes the Hypermedia Editor. FIG. 11 illustrates a Hypermedia Editor view of the Company Introduction Page. The Hypermedia Editor is a What-You-See-Is-What-You-Get (WYSIWYG) editor that displays a hypermedia document as the hypermedia document will appears to an end user. The developer can edit the hypermedia document until the developer is satisfied with its appearance.

The Script View of an online service displays a list of all the scripts in that service. FIG. 12 illustrates a Script View for the online catalog. Each script has a descriptor. The descriptor for an Event Script consists of the name of the event, the name of the visual object to which it applies, the name of the document containing that visual object, and the name of the subservice containing that document. The descriptor for a Function Script is simply the name of the function.

The developer can invoke the Script Editor to view and modify a script by double-clicking on that script's descriptor in the Script View. Alternatively, the developer can access an Event Script by double clicking on the visual object associated with the script from within the appropriate Designer Subtool. Function Scripts, on the other hand, can only be accessed from the Script View.

When the developer chooses the Link View of an online service, the Hyperlink Editor is invoked to view and modify the hyperlinks between the subservices of the online service. For hyperlinks between individual documents and files, see the Link View of the Hyperdocument Designer, below. For hyperlinks between whole services, see the Connectivity View of the Online Designer, above.

The Fee View of an online service provides access to the Fee Setter subtool. When invoked from the Connectivity View, the Fee Setter subtool allows the developer to specify the cost (if any) of accessing the service as a whole. To specify fees for individual documents or parts of a service, the developer invokes the Fee Setter subtool from the individual Designer Subtools such as the Hyperdocument Designer Subtool.

At any time while running the Online Designer, the developer may access the Replicator tool to specify replication behavior among services and subservices. The Metering Tool can be accessed to specify service and subservice metering characteristics, and the Repository Browser can be used to view and manipulate the contents of the Service Repository. In addition, the developer may invoke the Debugger to run and debug an online service or a single subservice.

Key Designer Subtools

Each of the Designer Subtools is used to develop a particular type of subservice within an online service. The most important and original Designer Subtools are: (1) the Hyperdocument Designer, for subservices that consist of linked hypermedia and portable documents; and (2) the Lookup Designer, for Directory Lookup, Classified Advertisement, and Reference subservices. This section describes these two Designer subtools in detail.

The Hyperdocument Designer Subtool

The Hyperdocument Designer 412 subtool is used to design Hyperdocument/Commerce subservices. Specifically, any subservice that displays hyperdocuments and supports hyperlinks between hyperdocuments is designed using the Hyperdocument Designer subtool. A typical online service will require these features to some degree, so most online services include at least one Hyperdocument/Commerce subservice.

Figure 14:
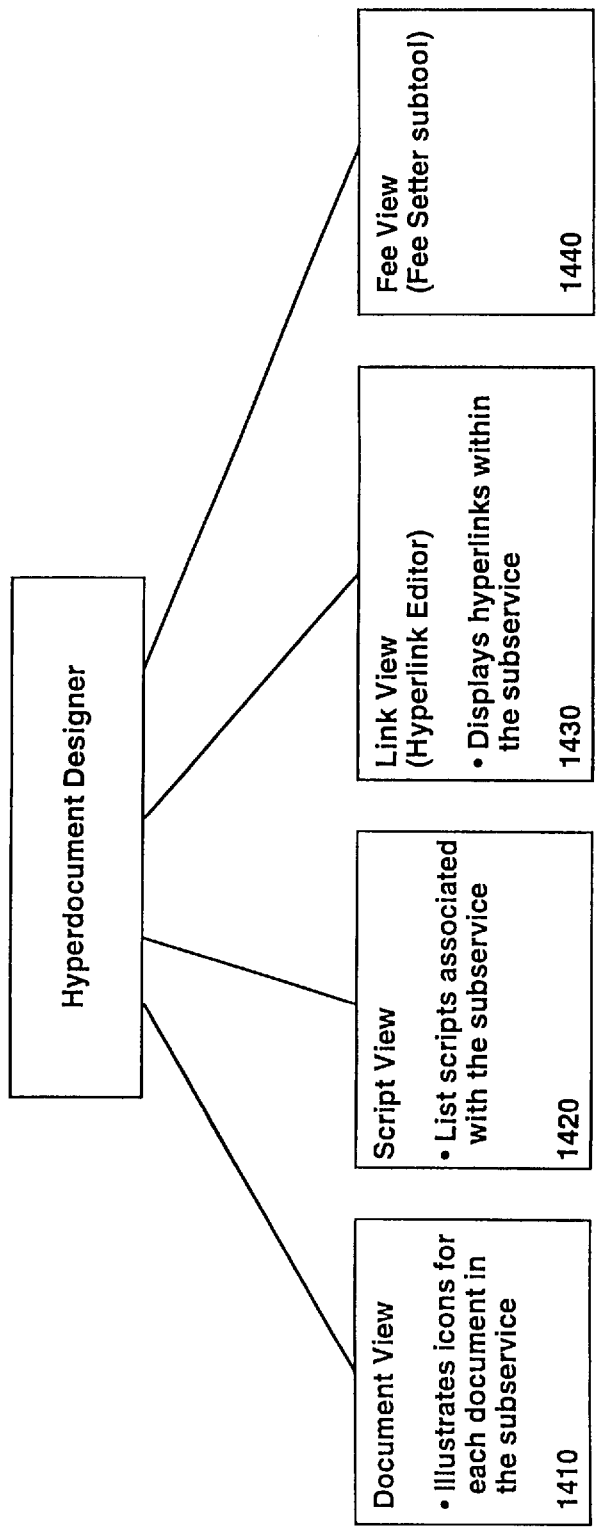
FIG. 14 illustrates a block diagram of the views supported by the Hyperdocument Designer.

When the developer double-clicks on a Hyperdocument/Commerce subservice icon from the Connectivity View of the Service Window for an online service, the Hyperdocument Designer is automatically invoked. Hyperdocument Designer supports four different views: Document View, Script View, Link View, and Fee View. FIG. 14 illustrates a block diagram of the different views supported Hyperdocument Designer. To switch between views, the developer chooses the appropriate menu item or clicks on the appropriate button on the Hyperdocument Designer toolbar.

Initially, Hyperdocument Designer displays the Document View, which shows one icon for each of the hyperdocuments that comprise the subservice. An example of a hyperdocument being viewed with the document view is illustrated in FIG. 13. Beneath each icon is the name of the document. The document icons are visually shown in the arrangement laid out by the developer. The developer may rearrange the document icons in the Document View using drag-and-drop mouse techniques, and the icon arrangement is preserved between sessions with Online Designer. The icon arrangement in the Document View is for developer convenience only, and has no bearing on the behavior of the hyperlinks that define the order in which the user sees documents. Double-clicking on a hypermedia document icon or portable document icon invokes the Hypermedia Editor or Portable Document Editor, respectively, to view and modify that document.

From the Document View, the developer may invoke the Hypermedia Document Converter or Portable Document Converter from the Hyperdocument Designer menus or toolbar. These two Converter tools translate preexisting documents from various file formats into the Online Designer's standard hypermedia document format or portable document format. After translating a document, the developer assigns a name and icon to the new hyperdocument, and repositions the new icon within the Document View as desired. The developer may then edit the hyperdocument to add visual objects using the Hypermedia Editor. The developer can connect the new hyperdocument using the hyperlink editor to edit hyperlinks that integrate the document into the subservice.

The Script View, Link View, and Fee View of the Hyperdocument Designer are analogous to the same views in the Online Designer tool itself. The Script View provides access to the Event Scripts and Function Scripts that pertain to the particular Hyperdocument/Commerce subservice. When the developer chooses the Hyperdocument Designer's Link View, the Hyperlink Editor is invoked to view and modify the hyperlinks between all documents and files associated with the subservice. The Fee View of the Hyperdocument Designer invokes the Fee Setter subtool to specify fees for individual documents and files in the subservice.

In effect, the Hyperdocument Designer is a Designer Subtool that provides organized access to the Utility Subtools that are most often used in designing a hypermedia and/or commerce subservice. For example, suppose that an existing mail-order catalog shopping company wishes to use the invention to design and deploy and online service that is the electronic equivalent of an existing mail-order catalog service. The developer could invoke the Hyperdocument Designer to create a new Hyperdocument/Commerce subservice.

Figure 15:
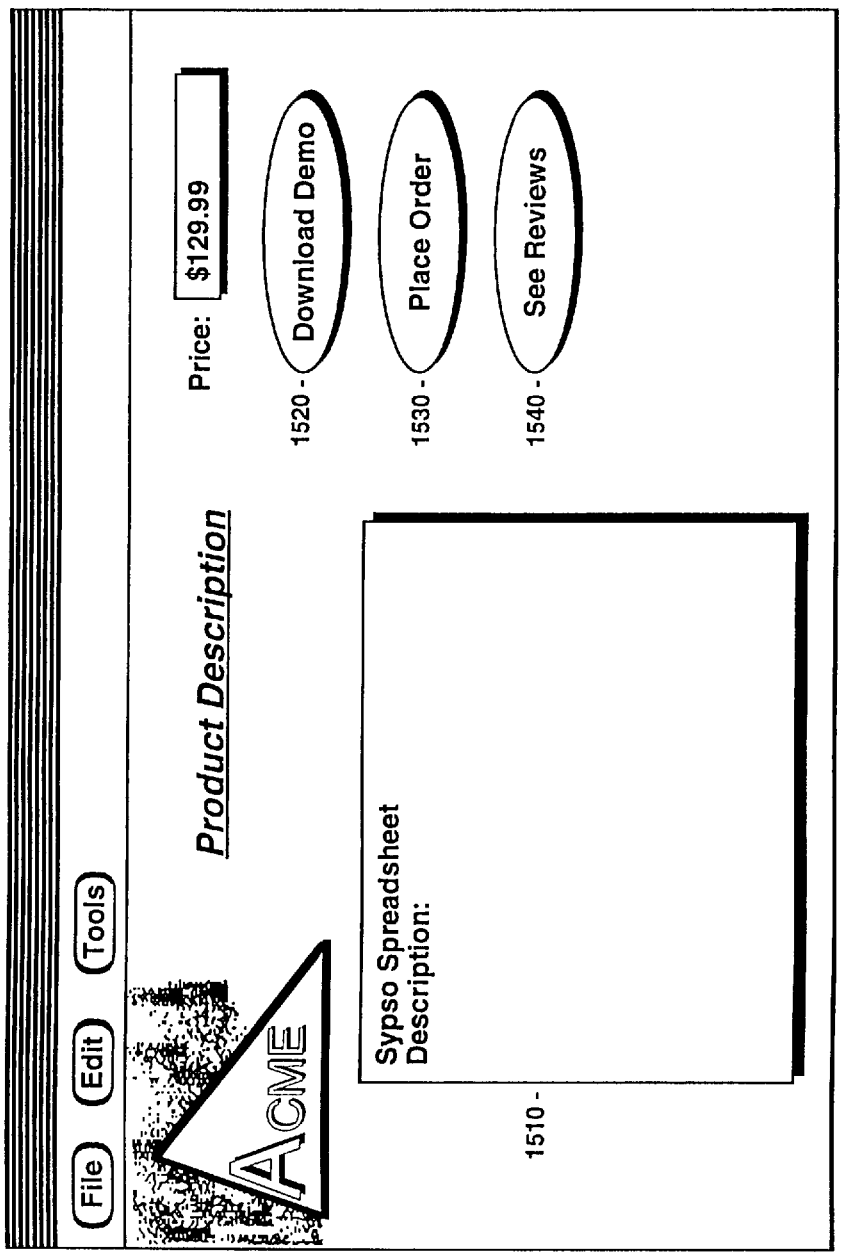
FIG. 15 illustrates a screen display of a hypermedia document.

The developer could use the Portable Document Converter to convert an electronic version of the company's catalog into a portable document. Using the Portable Document Editor, the developer could add hyperlink buttons to the portable document, which lead the user to the electronic order form from the catalog. From the Document View, the developer could invoke the Hypermedia Editor to create an electronic order form with a button to submit the order. FIG. 15 illustrates a hyperdocument that displays information about a product. The hyperdocument of FIG. 15 includes a "Place Order" button 1530 that moves the user to a purchase order screen.

FIG. 16 illustrates a purchase order screen that could be connected to the "Place Order" button with a hyperlink. The purchase order screen allows an end user to enter information to order the product. After the user has entered the necessary information, the user selects the "Purchase" button to buy the product. An event script processes the information and orders the product. To edit the event script, a developer double-clicks on the "Purchase" button 1630 from the Hypermedia Editor. The developer edits the script associated with the "Purchase" button 1630 script such that the script gathers the information from the form and submits the order as a transaction against the back-end order/inventory database system. When the design is complete, the deployed service allows users to view the catalog online, and place orders in real-time, without human intervention.

The Lookup Designer Subtool

The Lookup Designer tool designs Directory Lookup, Classified Advertisement, and Reference subservices. In each of these types of subservices, the user can search through a database of entries, and in some cases, the user can submit new entries. The differences between the subservice types include the kinds of visual objects found in the entries, the browsing and searching techniques supported, and whether or not the user can submit new entries for public viewing.

Figure 17:
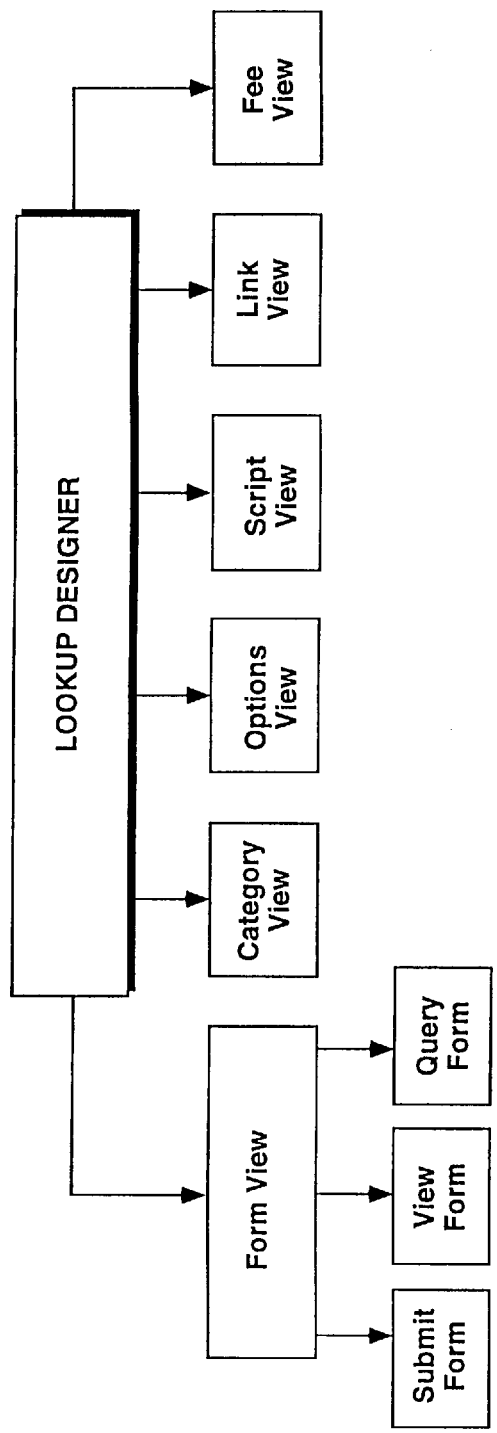
FIG. 17 lists the different views provided by the Lookup Designer subtool.

When the developer double-clicks on one of the three types of lookup subservices in the Connectivity View of the Service Window for an online service, the Lookup Designer is automatically invoked. As illustrated in FIG. 17, the Lookup Designer supports six views: Form View, Category View, Options View, Script View, Link View, and Fee View. As with the other Designer Subtools, the developer uses menus or the Lookup Designer toolbar to switch between the different views.

The initial view for Lookup Designer is the Form View. From the Form View, the developer uses the Hypermedia Editor to design the Submit Form, View Form, and Query Form for the subservice.

Figure 18:
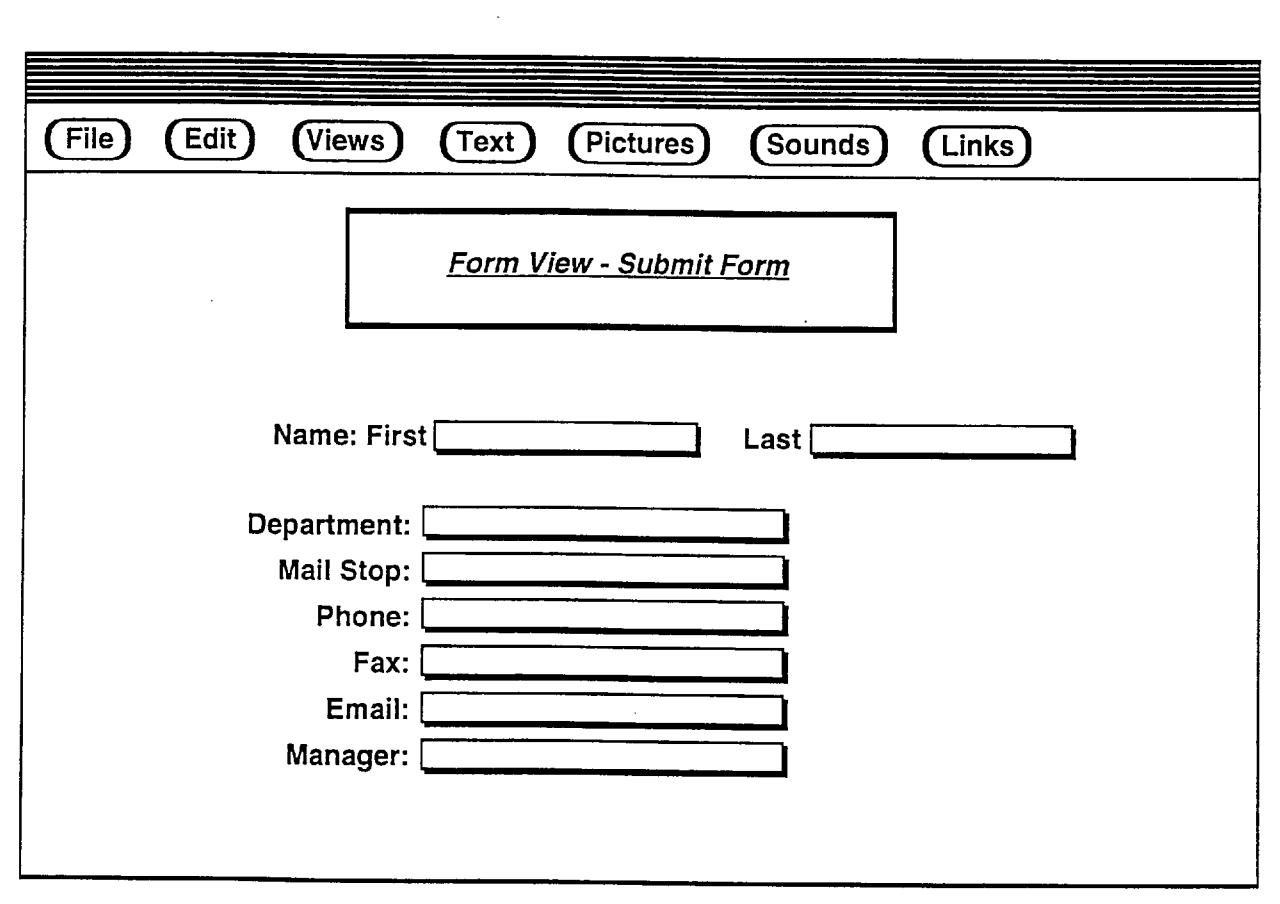

The Submit Form allows a user to submit a new entry to be listed on the subservice. FIG. 18 illustrates an example screen display for a submit form for the Corporate Personnel Directory subservice of FIG. 8.

Figure 19:
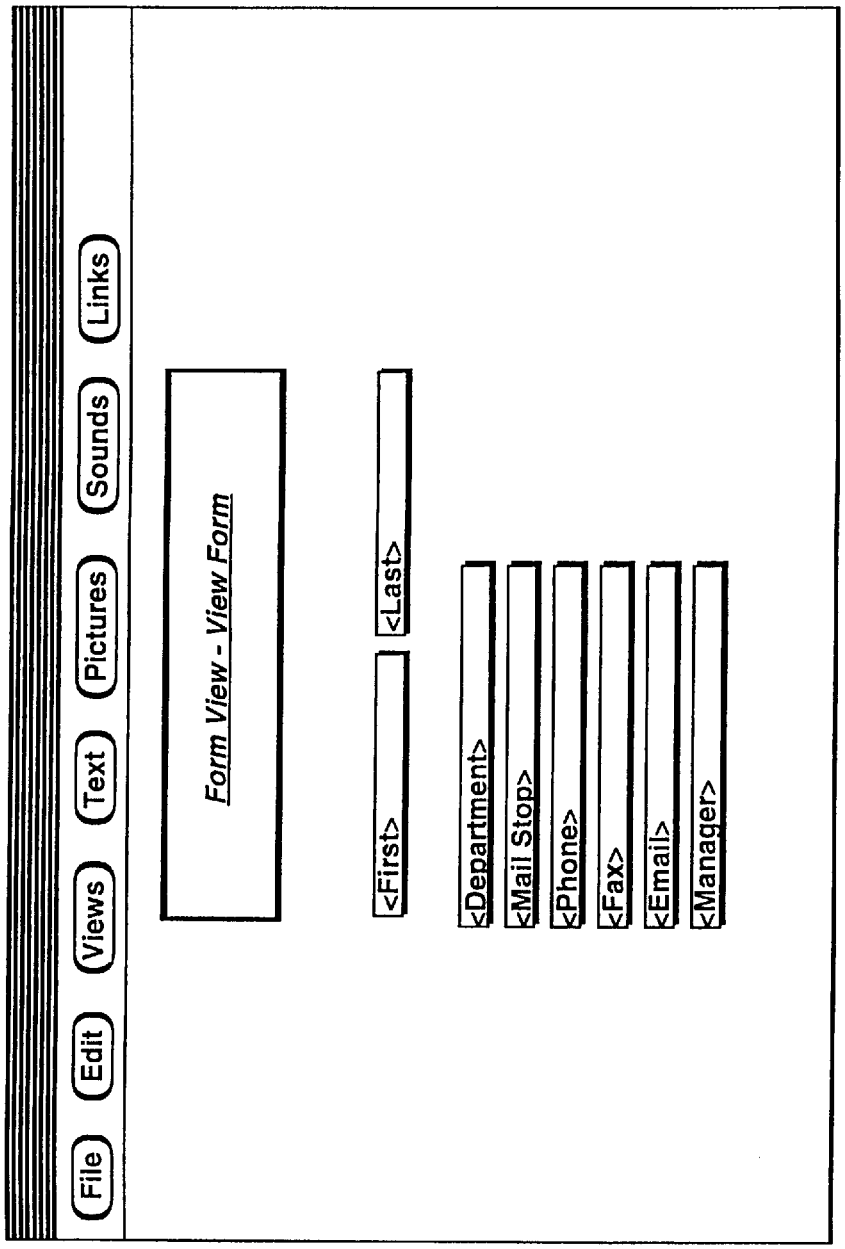
FIG. 19 illustrates a view form in the Form View of the Lookup Designer subtool.

The View Form is the template that displays the contents of an entry to the user. FIG. 19 illustrates an example screen display for a view form for the Corporate Personnel Directory subservice of FIG. 8.

Figure 20:
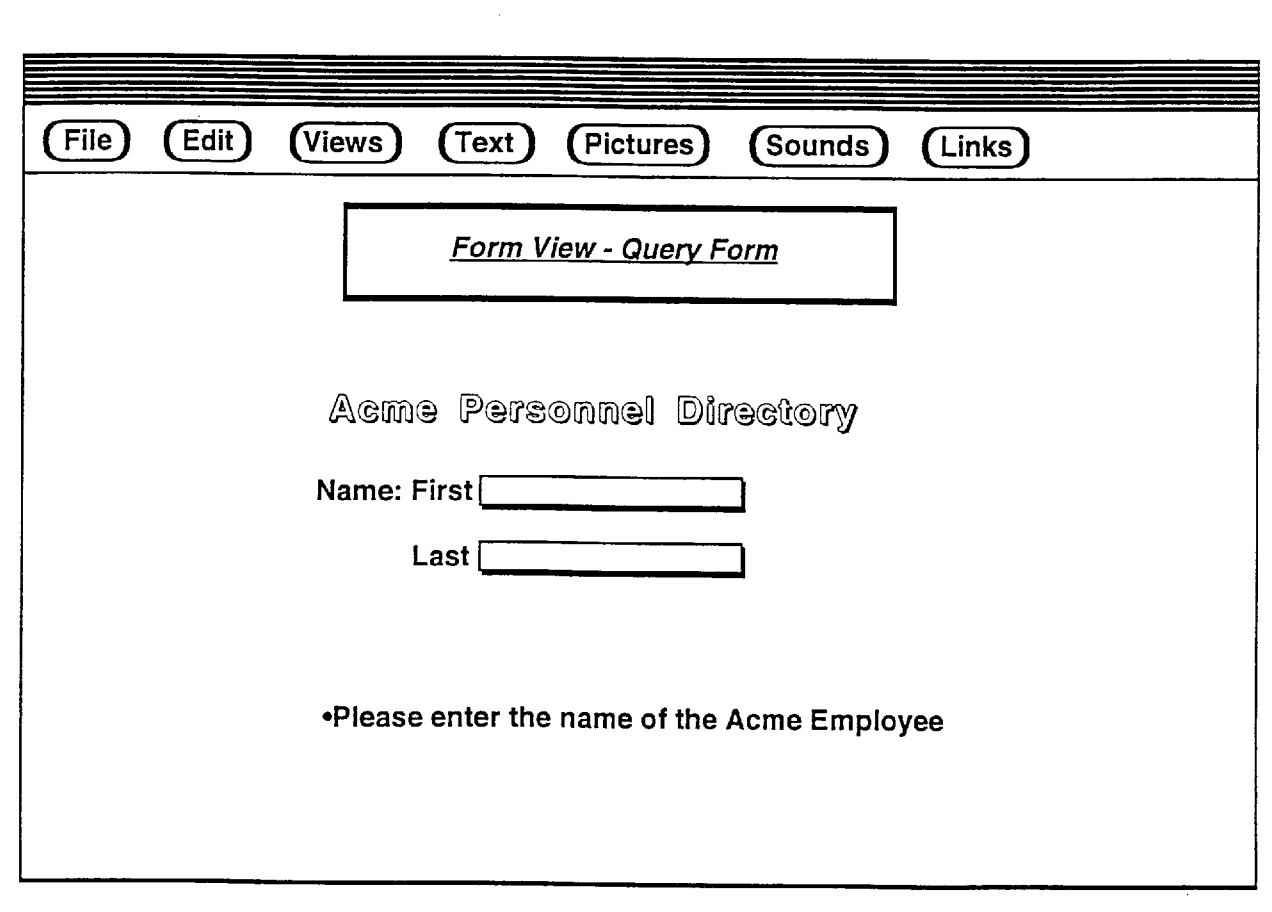

The Query Form allows the user to search for entries based on various criteria. FIG. 20 illustrates an example screen display for a query form for the Corporate Personnel Directory subservice of FIG. 8.

There are certain standard input fields that the various Lookup Designer forms may provide. A form need not use all of the standard fields. However, for the standard fields that are used, the form should also use the standard internal names for those fields so that the fields will be properly recognized and handled by Molisa. If a given form does not yet exist for a subservice, Online Designer provides a default form containing all standard supported fields, which the developer can modify.

The standard Lookup Designer form fields are as follows:

Name For Directory Lookup subservices, this is the person or entity name for the entry. For Reference subservices, this is the name of the item for which reference information is being provided. For Classified Advertisement subservices, this is the name of the person submitting the entry.

Address, Phone, Fax, E-mail For Directory Lookup subservices, these fields pertain to the person or entity listed in the entry. For Classified Advertisement subservices, they pertain to the person submitting the entry. These fields are typically not used for Reference subservices.

Categories The categories under which the entry should be listed. Typically, this is a pairing of two visual objects: a drop-down list box showing all of the categories recognized by the subservice, and a text entry field that displays the list of categories that the user has chosen so far for this entry. Note that the user must choose from among the categories specified by the developer in the Category View of the Lookup Designer when the subservice was designed. (The developer can of course change the list of categories at a later time using Online Designer.) This field is typically used in Classified Advertisement and "yellow pages" Directory Lookup subservices. The categories are used for browsing purposes, in that all entries that belong to a given category are shown together under that category name. In Classified Advertisement subservices, the categories can be used as part of the search criteria on a Query Form.

Keywords Similar to categories, but users can type in any keywords they deem appropriate, rather than being constrained to choose from a fixed list. Entries sharing a common keyword are not listed together in the subservice browser, but users can search the keyword fields of entries using the Query Form.

Slogan Advertising slogan. This field is typically only used in "yellow pages" style Directory Lookup subservices.

Description The descriptive text for the entry. For Classified Advertisement subservices, this is the text of the advertisement itself. For Reference subservices, this is the information about the named entry. For "yellow pages" style Directory Lookup subservices, this is the description of company products and services, hours of operation, etc. This field is typically not used for "white pages" style Directory Lookup subservices.

Image A graphic image to be displayed with the entry. In the Submit Form, this is a text field for the user to specify a directory path to the file containing the image. In the View Form, this is a picture field that displays the image itself. This field is typically used in "yellow pages" Directory Lookup subservices for a company logo or related graphic, or optionally in a Reference subservice for a picture of the named item.

Removal Date Date after which an entry should be automatically removed from the subservice. This is typically used for Classified Advertisement subservices, but it can also be used in Directory Lookup subservices to reduce costs for the submitter. A Classified Advertisement subservice can also have a global automatic limit on the number of days that an entry is listed (see the Options View, below).

Service Link Used for entries that provide a hyperlink icon leading to another online service. For example, a "yellow pages" entry can provide a link to an online service provided by the company listed in the entry. On the Submit Form, this is a text field for the user to provide the URL of the other online service. On the View Form, this is displayed as the hyperlink icon itself.

In addition to the standard Lookup Designer form fields, the developer may include other input fields that have specific meaning to the subservice being developed. Such fields make it easier to query the database of entries. For example, a Classified Advertisement subservice devoted to the purchase and sale of pre-owned automobiles can include form fields for the year, make, and model of the car. The end user can type specific information into those fields on the Query Form to find a matching entry, instead of performing a less-precise full-text search on the Description field of the entry.

The developer should associate any required scripts with the visual objects on a form, to specify the behavior of those visual objects. For example, on a Query Form, the developer should provide a script for the Search button on the form that specifies how to convert user input in the various fields of the form into a query against the subservice database of entries. To invoke the Script Editor to create a script for a visual object, the developer double-clicks on that visual object while viewing the associated form in the Hypermedia Editor.

The Category View of the Lookup Designer simply displays a list of the category names supported by the subservice. The developer can add, delete, and modify the categories from the category view.

In the Options View of the Lookup Designer, the developer specifies certain options about the behavior of the subservice. These include:

Updatable A checkbox that indicates whether users can submit new entries to the subservice for other users to view. If this box is not checked (e.g., for a Reference subservice), any entries submitted by a user can later be viewed by that user, but no one else.

Moderated A checkbox that indicates whether this subservice is moderated. If this box is checked, any newly submitted entries are not directly posted to the subservice. Instead, they are transparently transmitted by electronic mail to the moderator for the subservice. The moderator reviews the entry, and if it is deemed appropriate, the moderator posts the entry on behalf of the original submitter. This option is ignored if the Updatable checkbox is not checked.

Categorized A checkbox that indicates whether this subservice supports browsing by category. If this box is checked, all entries in a common category are grouped together under that category name for browsing by users. If a single entry is in more than one category, it appears under each of those categories. Typically, this box is checked for "yellow pages" Directory Lookup subservices and Classified Advertisement subservices. Whether or not this box is checked, the user may still perform standard queries against the database of entries using the Query Form for the subservice.

Sorting A drop-down list box that indicates how entries are sorted within a category for user browsing. Entries may be sorted in forward or reverse order based on the contents of any of the entry fields, and secondary and tertiary sort keys are supported with additional drop-down list boxes in the tool. In addition, the entry's date of posting is available as a sort key, even if that date is not displayed as part the entry itself. Typically, a "yellow pages" Directory Lookup subservice will sort in forward order based on the contents of the Name field, and a Classified Advertisement subservice will typically sort in reverse order of posting date.

Expiration The number of days that each entry remains listed on the subservice before it is automatically removed. This option may also be left blank, in which case there is no automatic expiration date for entries. If an entry has an individually specified Removal Date that occurs before automatic expiration, the entry's Removal Date is honored. Otherwise, the automatic expiration date is used.

The Script View and the Link View in the Lookup Designer are analogous to the Script View and the Link View in the Online Designer tool itself and in the Hyperdocument Designer.

The Fee View of the Lookup Designer is an optional feature that invokes the Fee Setter subtool, allowing the developer to specify the formula for computing the cost of viewing an entry (if any), and submitting an entry (if any). The Fee Setter subtool is described in greater detail in a separate section below.

Utility Subtools

The Utility Subtools provide capabilities that are useful in the design of multiple types of subservices. These subtools are accessed from the Designer Subtools, and from the Online Designer itself. The most significant and original Utility Subtools are: (1) the Hyperlink Editor, for manipulating hyperlinks within an online service; (2) the Script Editor, for editing the various scripts that control the behavior of an online service; (3) the Fee Setter, which allows the developer to specify any fees that should be charged to users or advertisers; (4) the Metering Tool, which provides instructions to the online service server regarding the usage statistics that should be tracked; and (5) the Debugger, which provides interactive running and debugging capabilities for an online service. This section provides the details on the five Utility Subtools.

The Hyperlink Editor Subtool

The Hyperlink Editor Subtool is a Utility Subtool that is used to display and manipulate hyperlinks within an online service. The hyperlinks within an online service can be viewed and modified at various levels of abstraction. For example the Hyperlink Editor Subtool can display and manipulate the links between different subservices within an online service, the links between different documents within a subservice, the links within a single document, or the individual attributes of the links themselves.

With the Hyperlink Editor, the developer can assign attributes to hyperlinks. Some important examples of hyperlink attributes include: (1) whether the hyperlink leads to the same document/file or to a different document/file; (2) whether the hyperlink leads to the same online service or a different online service; (3) whether the hyperlink leads to a service that the developer controls or doesn't; (4) the size of the document/file a link points to; (5) whether the link leads to a free service or one that has additional charges; and (6) the semantics of the hyperlink. The latter attribute is a semantics tag taken from a known list of possibilities, which includes simple linking, making a purchase, returning to the home page of the service, initiating a search, linking to a form that requests shipping address information, etc. The semantics attribute of hyperlinks provides some additional structure to online services, and encourages a degree of standardization in hyperlink usage.

The Hyperlink Editor supports both a Graphical View and a List View of hyperlinks. The Graphical View displays the hyperlinks as a directed graph, with the source and target of a hyperlink represented by visual icons, and displays the hyperlink itself as a directed arc connecting them. An arc's particular appearance (color, width, arrow design, and other visual cues) depends on the various attributes (above) associated with that hyperlink. The List View displays a list of the hyperlinks, showing the names of the linked entities and visual cues indicating the attributes associated with each hyperlink. The developer can modify the hyperlinks and attributes from either view.

A search facility within the Hyperlink Editor allows the developer to search through the online service for hyperlinks that satisfy a list of criteria. The search criteria are expressed as a set of attribute values associated with the hyperlinks, which the developer types into a search query form.

The Script Editor Subtool and the Online Script Language

The Script Editor is a Utility Subtool for editing the Event Scripts and Function Scripts of an online service. The script editor is accessed from the Script Views of the various Designer Subtools and the Online Designer itself. The developer can also invoke the Script Editor to edit the Event Scripts associated with a visual object by double-clicking on the visual object itself from within the appropriate Designer Subtool.

Figure 21A:
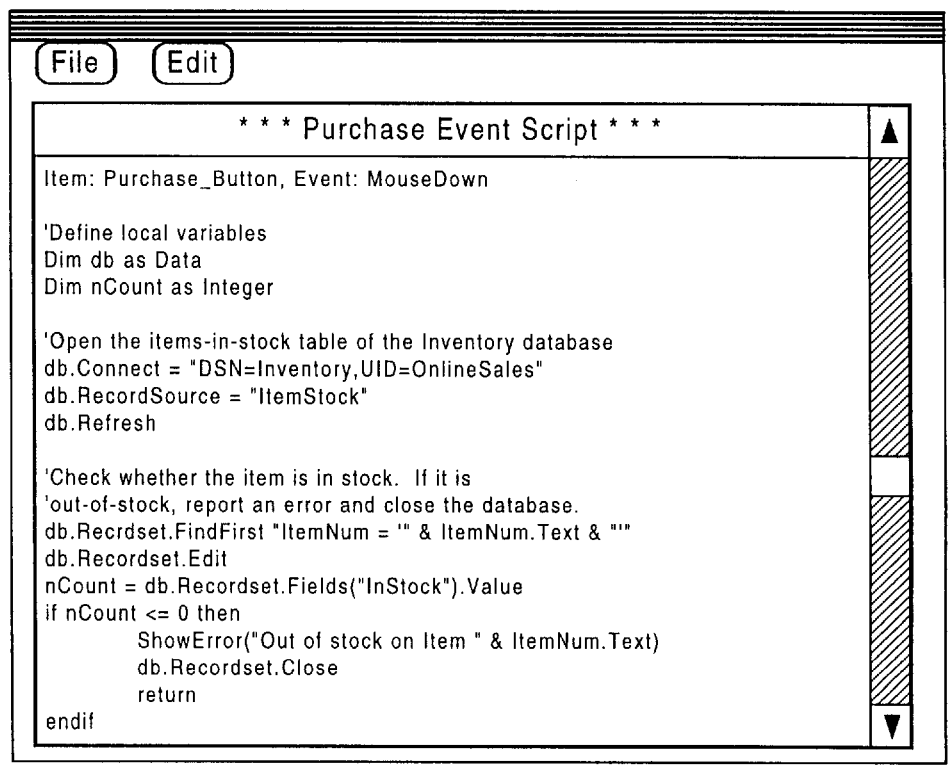
FIG. 21a illustrates a first screen display of the Script Editor.
Figure 21B:
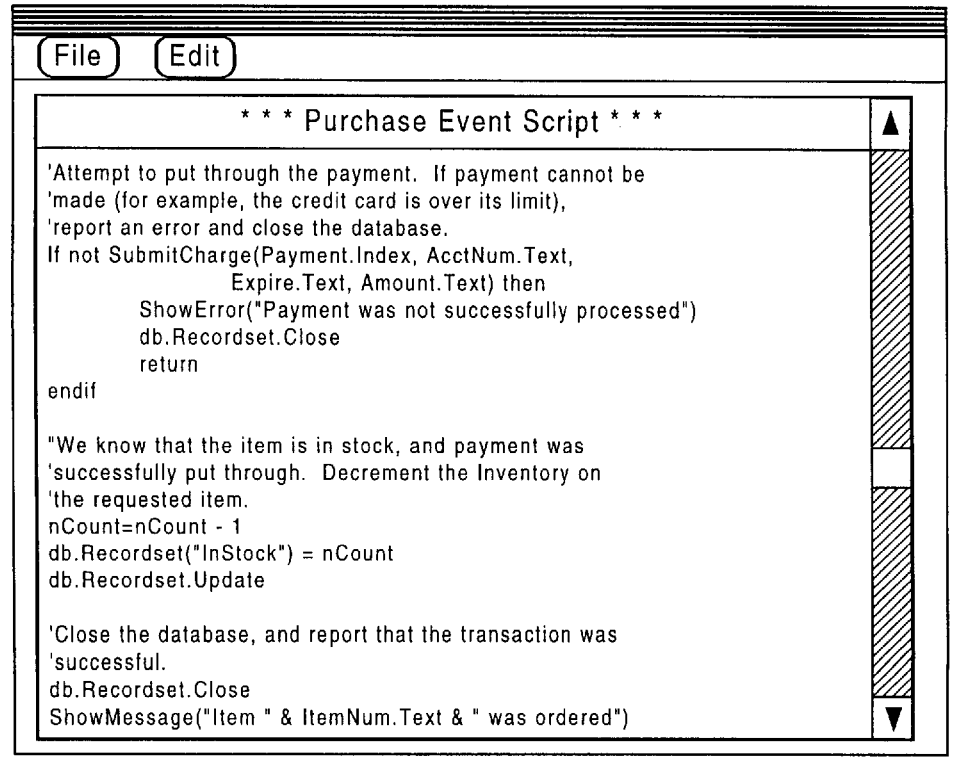
FIG. 21b illustrates a second screen display of the Script Editor.

For example, FIGS. 21a and 21b illustrate screen displays for the Script Editor editing an event script for the for the MouseDown event on the "Purchase_Button" of the hyperdocument illustrated in FIG. 16. The Purchase event script of FIGS. 21a and 21b checks the inventory, charges the customer, and updates the inventory if a sale is completed.

Event Scripts and Function Scripts conform to the invention's Script Language, a procedural programming language similar to the language BASIC (Beginner's All-Purpose Symbolic Instruction Code). The Online Designer Script Language includes variable declarations, numeric and string operations, conditional statements ("if . . . then . . . else"), control statements for looping ("for" and "while"), and functions (subroutines) with parameter passing. The Script Language includes a number of programming constructs and built-in functions. The programming constructs and built-in functions are collectively referred to as the Script Language "primitives". The primitives included in the Script Language have been chosen and optimized for implementing common features supported by online services.

Using the Script Editor, a developer can directly type and edit an event or function script. In addition, the script editor provides a menu-driven facility to paste script statement and function invocation archetypes into a script, which the developer can then modify appropriately. For example, the developer can use the menus to insert a "for" statement archetype that has placeholders for the conditional expression and statement body. Similarly, archetypes for all of the built-in functions and programming constructs can be inserted, with placeholders for the various function arguments.

Many of the key features of the present invention are accessed primarily through the primitives of the Script Language. In addition to normal programming language primitives for arithmetic, file input/output, etc., specific primitives are included to support for online services. The following sets of script primitives exist to support online services.

Program control primitives

A set of primitives are provided for transferring program control to another document, subservice, or service. This is the dynamic form of a hyperlink. By using these primitives in a script, the developer can choose the destination of a hyperlink at "run-time," in response to previous input from the user, or depending on the context in which the particular hyperdocument is displayed.

Telecommunication primitives

A set of primitives exist for performing various telecommunication tasks such as downloading files to a client system. For example, in electronic publishing, the user can click on a button to download the electronic version of a magazine. The Event Script associated with the "Mouse Down" event on that button would invoke the primitive to download the document. As another example, a script can invoke the primitive to download software for viewing JPEG compressed images if it does not find that external viewer already resident on the client workstation.

Text search and retrieval primitives

Primitives are provided to specify the various types of text search criteria: natural language, Boolean, and conceptual. Other primitives are provided to initiate the search, using the previously specified criteria, against specified data sources. For example, to perform a search based on the contents of a query form, a script should construct an appropriate Boolean text query from the keywords typed into the user input fields on the form, and submit that query using the Boolean criteria language primitives. Then, the script should invoke the built-in function that initiates the search, passing an argument to that function that specifies the ID of the target database for the search.

External database access primitives

Figure 22:
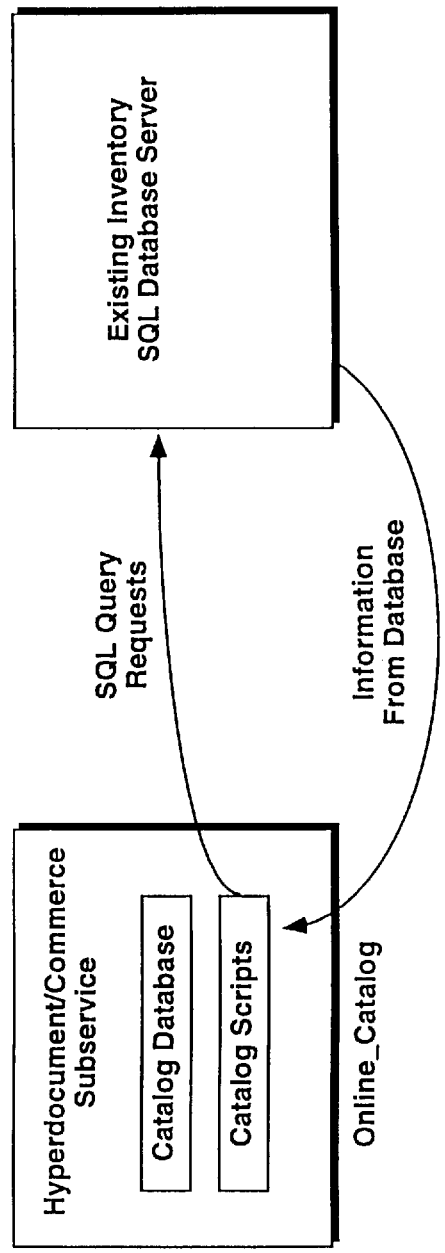
FIG. 22 illustrates an SQL query between an online subservice and an SQL database.

Direct access to external databases and real-time data is provided using specific script primitives. The external database primitives provide the most common and standardized constructs supported by Structured Query Language (SQL), to access relational database systems. In addition, the Script Language includes a general SQL primitive that can accept any sequence of native SQL statements, either as an argument to the function or contained in a specified file, and pass those SQL statements directly to the relevant database system as illustrated in FIG. 22. Any results from the database query are returned to the subservice that made the query. For non-SQL databases (and certain SQL databases), there are primitives for Open Database Connectivity (ODBC).

External communication primitives

A set of primitives exist that allow an online service to communicate with other programs and users. For example, the primitives are provided with allow a script to send an electronic mail message, a facsimile transmission, a voice mail message (using text-to-voice techniques), or a message to an electronic wireless pager.

Application program control primitives

The Script Language provides various primitives for launching other application programs, sending data to those programs, and receiving data from those programs. The names and semantics of the external program control primitives differ according to the server platform that will run the online service.

For example, under a Microsoft Windows NT Server Version of the Online Designer, there are Script Language primitives for Dynamic Data Exchange (DDE), launching another application with optional keystroke stuffing, and batch invocation. To support an online service acting as a DDE client, there are primitives for standard DDE Connect, Disconnect, Execute, Poke, Request, Advise, and Unadvise actions. In addition, the developer may write Event Scripts that trigger on DDE Advise events from other programs.

For launching and keystroke stuffing, the Script Language provides primitives that launch a named software application, optionally wait for the application to finish or let it run concurrently, and optionally "stuff" specified keystrokes into the launched application with suitable pauses at specified points in the keystroke stream. The batch primitives simply launch a batch file or batch-style application with a given command line, and the Script Language file I/O primitives can then be used to read and parse the output of the batch process (if any). For other server platforms (OS/2, UNIX, etc.), other application control primitives are provided that are appropriate on those platforms. For example, terminal emulation primitives are one mechanism provided under UNIX.

External control primitives

Script Language primitives are provided that send commands to, and receive data from, electronically controlled equipment such as heating systems, ventilation systems, air-conditioning systems, security systems, and lighting.

Access control primitives

Using the access control primitives of the Script Language, a script can request a password from the user, encrypt and decrypt files to be downloaded or sent to another service, and dynamically determine whether a given user should be given access (read only, write only, read/write, or none) to a particular document or part of a service. These run-time language primitives augment the static access control mechanisms that the developer can specify at design time using the invention.

Service-to-service communication primitives

The Script Language provides service-to-service communication primitives that allow one online service to: (1) act on behalf of the user to query or update another online service; (2) automatically update another online service without user initiation; (3) appear to be seamlessly part of another online service; (4) keep a record of how many times users traverse to another online service; (5) pass along automatic user registration data to another online service; (6) automatically register a new online service with a service-of-services or "yellow pages" service; (7) check whether another server is running a particular online service or type of service; and (8) exchange usage and metering information, for aggregation and later analysis. Each of these primitives opens a virtual connection to the target service, using the service-to-service protocol.

User communication primitives

User communication primitives exist that allow users to engage in real-time cooperative activity. These user communication Script Language primitives provide a Named Pipes style communications interface between two or more users, or between users and a representative of the online service provider. For example, such primitives can support a multi-person game between users, or a user entering an online query and receiving a real-time response from a representative of the service provider. The primitives to establish a connection include the ability to specify a specific user with whom to communicate, or a "broadcast" facility to find any current user on a given server who wishes to establish a given class of cooperative connection.

Image capture primitives

Primitives are provided that: (1) command the server software to accept a facsimile that is sent to the server's fax modem from a user's fax modem or fax machine having a given identification, (2) command the server software to accept an image transmitted by electronic mail to the server, or (3) command the client software to accept a scanned image (using the TWAIN scanning standard) and transmit that image to the server. Once captured, other Script Language primitives allow the image data to be incorporated into other documents. For example, a logo for a "yellow pages" listing or a photograph for an online classified advertisement.

The Script Editor works cooperatively with the Debugger, to allow single-stepping through scripts, displaying script variables, etc. In debug mode, the Script Editor allows certain limited changes to a script. More major script changes require that the developer stop the simulation first.

The Fee Setter Subtool

Fee Setter Introduction

The Fee Setter subtool allows the developer of an online service to specify the fees that will be levied on or paid to users, as users use the service and access the information it contains. The Fee Setter subtool of the Online Designer can also be used to define fees levied on or paid to information content providers. The online service framework automatically levies and pays the fees according to the Fee Setter instructions, on behalf of the organization that operates the online service.

The actual transfer of monetary funds specified by the Fee Setter can be effected on an immediate or periodic basis using mechanisms external to the Fee Setter itself. For example, the Fee Setter can use credit card charges or electronic funds transfer to charge users of an online service. Similarly, the Fee Setter can use electronic funds transfer or traditional paper-based billing and payment mechanisms to bill content providers, or other similar means. The Fee Setter specifies the fees to be levied and the payments to make, and the external mechanisms arrange the funds transfer to actually cover those fees and payments.

The Fee Setter is used for all of the various chargeable entities in an online service. As such, the Fee Setter is accessible from the Fee Views of the Online Designer itself and from the Fee Views of each of the Designer Subtools. For example, the Fee Setter can be accessed from the Fee View of the Hyperdocument Designer to charge fees for documents and for following hyperlinks to other subservices. Similarly, the Fee Setter can be accessed from the Lookup Designer to charge fees to users who view/download entries and those who submit new entries.

Many fees are simply constant monetary amounts; e.g., a $2.00 fee to download a particular document. Other fees are more complex. The fees can depend on the size of a document, the time of day, the load on the server, the identity of the user, the number of previous documents downloaded or submitted by this user, etc., depending on the information provider's policies and intentions. For classified advertisement submissions, the fee for submitting the advertisement can include the size of any graphic image in the advertisement, the number of categories under which the advertisement is listed, and the number of days that it is listed.

The Fee Computation in a Fee Specifier supports simple and complex fee structures. The formula itself is specified using a subset of the online service Script Language. When writing the Fee Formula, the developer writes a sequence of script statements, possibly including variable declarations, such that the appropriate fee is assigned to the reserved global variable "Fee@" some point before the end of the script.

Example Fees

To illustrate some of the types of fee structures that can be created using the Fee Setter, several examples of fees that can be defined with the Fee Setter are listed below. It should be understood that these are examples only, and that many other types of fee structures can be created using the Fee Setter of the present invention:

Levying Fees on Users

- Levying a fixed fee on users whenever certain textual or graphic information is viewed or downloaded from the online service.
- Levying a variable fee on a user for accessing information, depending on the amount of information that particular user has accessed in the past. Thus, a quantity discount can be offered to users that frequently access a particular online service.
- Levying a variable fee on users for accessing information, wherein the fee charged depends on the time of day that the information is accessed or on the current load on the online service server. Thus, the amount of the fee would discourage access during peak periods by assigning a premium during peak hours.
- Levying variable fees on users depending on the size of the information accessed, or on the amount of time required to access, view, or download the information.
- Levying different fees on different classes of users. For example, users that have paid for an annual membership will receive a discount.
- Levying a fee on users for simply connecting to a given online service. For example, an online service that provides investment advice could charge for access.
- Levying a fee on users who access certain parts of an otherwise free online service. For example, in an online service provided by a free newspaper publisher, a fee could be charged for users who wish to access the full-text search capabilities on back issues.
- In a classified advertising online service, levying a variable fee on users who electronically submit new listings to the service, depending on the size of the listing.

Paying Fees to Users

- Paying a fixed fee to a user in exchange for that user filling out a market survey questionnaire.
- Paying a fixed monetary prize to a user as winnings from a contest run by the online service operator.
- Paying a variable fee to a user as proceeds from (legal) gambling conducted on the online service. Thus, users could engage in gambling from home.

Levying Fees on Content Providers

Levying a fixed fee on a content provider whenever a user views or downloads that provider's textual or graphic information from the online service. For example, when a user views or downloads a content provider's advertising brochure or investment prospectus, a small fee would be levied on the content provider.

Levying a variable fee on a content provider when a user accesses the provider's information, depending on the amount of information that all users have accessed from that provider in the past. Thus, an advertising quantity discount to the content provider.

Levying variable fees on content providers depending on the amount or size of information carried on the online service, and on how many days that information is carried on the service.

Levying different fees on different classes of content providers. For example, an online service provider could give a discount to non-profit organizations that advertise on the online service.

Levying a fee on another online service provider whenever a user clicks on a hyperlink from the current online service that leads to the content provider's own online service. This would in effect be a referral fee.

In a "yellow pages" style online service, levying a variable fee on a content provider depending on the number of categories under which the provider's listing (and advertisement) is carried. Thus the easier it is to find the content provider's advertisement, the more the online service provider would charge.

Paying Fees to Content Providers

Paying a fixed fee to a content provider whenever a user views or downloads a particular document or program posted by that content provider. Thus content providers can supply informative reports, software programs, images, sounds, etc. that would be available to users of the online service. When a user requests the content provider's material, the users would be a charged for the material and the fees charged to the user would be divided between the content provider and the online service operator.

Paying a variable fee to a content provider depending on the size of the provider's textual or graphic information that is downloaded by all users.

Paying a variable fee to a content provider when users perform full-text searches across the provider's database of documents. The fee paid to the content provider depends on how much time was spent performing searches (even if no documents were ultimately viewed or downloaded).

Paying a variable fee to a content provider of (say) stock photo images when an end-user downloads an image, where the fee depends on the total number of images downloaded by all end-users in the past; in effect, a quantity discount to the online service operator on paying for content.

Fee Specifiers

The Fee Setter allows the developer to use the mouse, toolbar, and menus to create, modify, and delete individual Fee Specifiers. A Fee Specifier is a tuple that consists of four different parts: (1) An action that triggers the fee. This can be a traverse of a hyperlink, the downloading of a document, the uploading of an advertisement, etc.; (2) The argument values (if any) that are required by the specified action; (3) The entity to whom the fee should be charged or to whom the payment should be made. This can be a user of the online system or a content provider; (4) A Fee Computation that specifies exactly how a fee or payment is computed.

The Fee Setter displays the Fee Specifiers in a list. For example, FIG. 23 illustrates a list of Fee Specifiers that can be used to assign fees in one particular online service. Each Fee Specifier describes one particular type of fee for using the online service. The Fee Computation is not displayed directly in the Fee Setter list. Instead, in each Fee Specifier, an on-screen button is displayed that can be clicked by the developer to access the Script Editor to view and edit that Fee Computation. FIG. 24 illustrates a Computation Script Editor view of a Fee Specifier.

The detailed descriptions of each element in the Fee Specifier tuple are given below:

Action: This is the type of action that triggers the fee to be charged or the payment to be made. The allowable Action values are:

Access The action of a user accessing (viewing, downloading, "running") an object. The supported objects are: document, image, video clip, sound clip, and script.

Submit The action of a user submitting (uploading) an object. The supported objects are: document, image, video clip, and sound clip.

Traverse The action of a user clicking on (traversing) a hyperlink in a particular document.

Connect The action of connecting to the online service.

Daily Indicates that the fee or payment is recomputed and reassessed once each day.

Weekly Indicates that the fee or payment is recomputed and reassessed once each week.

Monthly Indicates that the fee or payment is recomputed and reassessed once each month.

Annually Indicates that the fee or payment is recomputed and reassessed once each year.

Argument: This is the argument value (if any) required by the action element of the Fee Specifier. The Argument values required by each of the various types of Action are as follows:

Access The file system path of the affected object. For example, "/pub/www/clothing/order.html."

Submit The file system path of the document form that was used to submit the object. For example, "/pub/www/classifieds/newlisting.html."

Traverse The hyperlink being traversed. It is specified as the path of the document containing the hyperlink, followed by three slashes ("///"), followed by the URL of the hyperlink itself as contained in that document. For example, "/pub/www/yellow/acme.html///http://www.ac me.com."

Connect Requires no argument. The argument field should be left blank.

Daily Requires no argument. The argument field should be left blank.

Weekly Requires no argument. The argument field should be left blank.

Monthly Requires no argument. The argument field should be left blank.

Annually Requires no argument. The argument field should be left blank.

Entity: This is the entity to whom a fee should be levied or paid from the online service operator. The allowable Entity values are:

Provider The fee should be levied or a payment should be made to the content provider.

User The fee should be levied or a payment should be made to the user.

Note that if the action element of the Fee Specifier is "Daily" the entity element is "Provider", the Fee Specifier is recomputed and reassessed for every content provider in the online service each day. Similarly, if the action is "Daily" and the entity is "User", then the Fee Specifier is recomputed for every user of the online service each day. The same principle holds for fees that have the action triggers of "Weekly", "Monthly", and "Annually."

Fee Computation. This is a script, written in the Computation Language, that specifies how the fee to be levied or paid is to be computed. Details of the Fee Computation are provided in a separate section below.

Example Fee Specifiers

To best illustrate the use of Fee Specifiers, two examples of Fee Specifiers are listed below ---
Example Fee Specifier #1
---
```
<
    Access,
    /pub/www/research/crop-forecast-94.html,
    User,
    Fee@ = 5.00
>
```
---

This first Fee Specifier indicates that a fee should be charged whenever a user accesses (views or downloads) the document identified by the path "/pub/www/research/crop-forecast-94.html," since the action is "Access" and the argument is the "/pub/www/research/crop-forecast-94.html" path name. When a users performs such an access, the online service should levy a fee of $5.00 on the user.

---
Example Fee Specifier #2
---
```
<
    Daily,
    ,
    Provider,
    Fee@ = 0.0
    For i% = 1 To ProviderFileCount%(Provider%)
        Fee@ = Fee@ + (1E-6 * FileLen(ProviderFilePath$(Provider%,
        i%)))
    Next i%
>
```
---

This second example Fee Specifier indicates that each day, a particular fee should be charged to each content provider. The daily fee is calculated by charging $0.000001 for each byte of file data that is owned by that content provider on the online service. Stated more simply, each content provider is charged approximately $1.00 for each megabyte of data stored on the online service per day. Note again that the list of Fee Specifiers shown in the Fee Setter do not actually contain the entire Fee Computation above. Instead, an on-screen button in the Fee Specifier tuple can be clicked to launch the Script Editor, allowing the developer to view and modify the Fee Computation.

The online service framework automatically executes the appropriate Fee Specifiers whenever their associated actions occur. Thus, when the user accesses a document, the "Access" Fee Specifiers (if any) whose argument element is the path to that document will be executed, resulting in a fee being levied or paid for each such Fee Specifier. Once a day the "Daily" Fee Specifiers are executed, and so on.

Note that, in many cases, a Fee Specifier that levies a fee on a user for accessing information will be accompanied by another Fee Specifier that pays part of that fee back to the content provider. Conversely, a Fee Specifier that pays a fee to the user (e.g., for filling out a market survey questionnaire) will often be accompanied by a Fee Specifier that levies a comparable fee on the content provider.

Fee Computation

The Fee Computation in a Fee Specifier supports simple and complex fee structures. Each Fee Computation is expressed using the Computation Language, which is a subset of the online system development tool's full Script Language. When specifying the Fee Computation, the developer writes a sequence of script statements such that when the script is executed by the server, the appropriate fee is assigned to the predefined global variable "Fee@" at some point before the end of the script. If the final value of Fee@ is positive, then a fee is levied on the entity by the online service operator; if it is negative, the fee is paid to the entity by the service operator.

Computation Language Basics

The Computation Language is a subset of the invention's Script Language, which is itself similar to the computer programming language BASIC (Beginner's All-purpose Symbolic Instruction Code). A very brief overview of the Computation Language is provided below. The reader is referred to any comprehensive reference on the BASIC programming language for a description of the detailed semantics of these programming constructs.

| Action | Statement Syntax |
|---|---|
| Expression evaluation | Operators (+, −, *, /, etc.) and function calls, in the usual fashion |
| Variable assignment | <variable> = <expression> |
| Conditional execution | If <condition> Then<br>    <statements><br>[Else<br>    <statements>]<br>Endif |
| Repeated execution | Do While <condition><br>    <statements><br>Loop |
| Iterative execution | For <variable> = <expression> To <expression><br>    <statements><br>Next <variable> |

In the Computation Language of the present invention, explicit variable declarations are not used or required. Instead, the suffix character used on a variable name determines the data type of the variable:

| Suffix | Data Type | Range | Example Constants |
|---|---|---|---|
| % | Integer | +/−2,147,483,647 | 3019, −12 |
| ! | Floating pnt | +/−4.94 × 10$^{-324}$ to +/−1.79 × 10$^{308}$ | −2.25, 2.879E-35 |
| @ | Currency | +/−922337203685477.5807 | 562.91, −0.1822 |
| $ | String | 0 to 65,500 characters | "Hello","" |
| # | Date/Time | 01-Jan-0000 0:00 to 31-Dec-9999 23:59 | #02-Apr-94 1:45 pm# |

The Currency data type (variables with the @ suffix) supports up to 4 digits to the right of the decimal point. It maintains exact decimal accuracy, making it especially suitable for monetary calculations. In the Date/Time data type, the base unit is days such that adding or subtracting an integer adds or subtracts days; adding or subtracting a fraction adds or subtracts time as a fraction of a day. For example, adding 10 adds 10 days, while subtracting ¹⁄₂₄ subtracts one hour.

Predefined Global Variables

There are 5 predefined global variables available to a script that comprises a Fee Computation. The 5 predefined global variables are defined below:

Fee@ When the Computation Language script that defines the Fee Computation is complete, the final value of the Fee@ predefined global variable is the fee that is levied on the entity (if the value is positive) or paid to the entity (if the value is negative).

Arg$ The value of the argument element of the Fee Specifier. The Arg$ is provided as a notational convenience.

Provider% The provider identifier number of the content provider associated with the action that triggered the Fee Specifier. This predefined global variable is available when the entity element of the Fee Specifier is "Provider". If the action is "Access", the value of Provider% is the identifier number of the content provider that owns the information that was accessed. If the action is "Daily", "Weekly", "Monthly", or "Annually" (and the Fee Specifier is "Provider"), the Fee Specifier is evaluated once for each content provider of the online service. In this case, the Provider% value is the provider identifier number of the current content provider being referenced in this iteration of the Fee Specifier computation.

User% The user identifier number of the user associated with the action that triggered the Fee Specifier. This predefined global variable is available when the entity element of the Fee Specifier is "User". If the action is "Access" or "Submit", the value of User% is the ID number of the user that accessed or submitted the information. If the action is "Daily", "Weekly", "Monthly", or "Annually" (and the Fee Specifier is "User"), the Fee Specifier is evaluated once for each user of the online service. In this case, the User% value is the user identifier number of the current user being referenced in this iteration of the Fee Specifier computation.

Access Time# The amount of elapsed time that was required to access the current object. This predefined global variable is valid only in "Access" or "Submit" Fee Specifiers.

Available Built-In Functions

All of the primitives of the Script Language are available in the Computation Language. These primitives include built-in functions for general computing purposes (e.g., "Now( )" to obtain the current date/time, "FileLen(<path>)" to determine the length of a file, etc.), as well as built-in functions that are specific to online services. The online service primitives that are of particular interest for creating Fee Computations are detailed below:

ProviderFileCount%(<provider_num>)
  Returns the total number of files, carried on the online service, belonging to the content provider whose provider identifier is <provider_num>.

ProviderFilePath$(<provider_num>, <index>)
  Returns the path of the file at index <index> in the list of files associated with the content provider whose provider identifier is <provider_num>. The allowable range of <index> is 1 through ProviderFileCount%(<provider_num>), inclusive.

ProviderTotalAccessCount%(<provider_num>)
  Returns the total number of files, belonging to the content provider whose provider identifier is <provider_num>, that have ever been accessed by any users on this online service. The ProviderTotalAccessCount% function is useful for computing quantity discounts.

ProviderTotalAccessSize%(<provider_num>)
  Returns the total size of the files, belonging to the content provider whose provider identifier is <provider_num>, that have ever been accessed by any users on this online service. The ProviderTotalAccessSize% function is useful for computing quantity discounts.

ProviderTotalContentCount%(<provider_num>)
  Returns the total number of files on this online service belonging to the content provider whose provider identifier is <provider_num>.

ProviderTotalContentSize%(<provider_num>)
  Returns the total size of all files on this online service belonging to the content provider whose provider identifier is <provider_num>.

ProviderAttrSet(<provider_num>, <attr_name>, <value>)
  Associates, with the content whose provider identifier is <provider_num>, an attributed name <attr_name> having value <value>. If that attribute already exists for that provider, replaces the value of the attribute with this new value. One example of using attributes on content providers might be to record in a "Non-profit" attribute the value "Yes" or "No," depending on whether the provider is a non-profit organization.

ProviderAttrGet$(<provider_num>, <attr_name>)
  Gets the value of the attribute named <attr_name> for the content provider whose provider identifier is <provider_num>. The value is returned as a string, but can be converted to any other appropriate type using the data type conversion functions provided by the Computation Language and the Script Language. Text to data conversion functions are well known in the art and are not discussed in this document.

UserTotalAccessCount%(<user_num>)
  Returns the total number of files that have ever been accessed by the user whose user identifier is <user_num>. The UserTotalAccessCountFunction% is useful for computing quantity discounts.

UserTotalAccessSize%(<user_num>)
　　Returns the total size of the files that have ever been accessed by the user whose user identifier is <user_num>. The User Total Access Size Function is useful for computing quantity discounts.

UserAttrSet(<user_num>, <attr_name>, <value>)
　　Associates, with the user whose user identifier is <user_num>, an attribute name <attr_name> having value <value>. If that attribute already exists for that user, replaces the value of the attribute with this new value. One example of using attributes on users might be to use an "Age" attribute to record the age of the user. This information might be used to offer senior citizen discounts on downloading fees, for example.

UserAttrGet$(<user_num>, <attr_name>)
　　Gets the value of the attribute named <attr_name> for the user whose user identifier is <user_num>. The value is returned as a string, but can be converted to any other appropriate type using the data type conversion functions provided by the Computation Language and the Script Language.

UserSearchTime#(<user_num>, <provider_num>)
　　Returns the total amount of time that the user whose user identifier is <user_num> has been searching the content databases of the content provider whose provider identifier is <provider_num>, in this session.

EntryCategoryCount%(<path>)
　　In a "yellow pages" or classified advertisement style service, returns the total number of categories under which the entry, whose file path name is <path>, has been listed. Entries that are listed under many categories can be charged a higher fee than entries that are listed in only a few categories.

ServerLoad!( )
　　Returns the current load on the server as a value between 0.00 and 1.00, with 0.00 meaning no server load and 1.00 meaning that the server is fully loaded. The ServerLoad function can be used to set fees depending on the current load on the server. To discourage access during peak usage periods, higher prices can be assigned during peak usage times.

The Metering Subtool

A wide variety of metering capabilities are provided by the Molisa online service platform. The metering capabilities track the usage patterns of an online service, and the usage by users and other services. The metering information can provide invaluable feedback on the volume and duration of access to documents, subservices, and the online service as a whole. Furthermore, the metering information is available from the Fee Computation language using defined functions such that fees can be based on user usage.

It would be an unnecessary performance burden for the server to gather all possible statistics on all possible online service entities. With the Metering Tool, the developer indicates specifically which statistics should be gathered, and on which parts of the online service. The online service server tracks service usage in the ways specified in the metering subtool. (The server also gathers the specific usage data required by the fees indicated in the Fee Setter subtool.)

The Metering subtool allows the developer to manipulate a list of Metering Specifiers. Each Metering Specifier is a pair consisting of: (1) an online service entity (document, hyperlink, subservice, service, etc.), and (2) the particular property of that entity that should be metered. The properties that can be metered include: number of users who access the entity, number of minutes that they use the entity, total number of times that the entity was accessed, number of times the entity was viewed vs. downloaded, number of times the entity was requested by another service, times of day that entity is accessed, etc.

After gathering metering information, the online service provider can view the metering information in graph, chart, and numeric form, using separately provided analysis software. The metering information can be used to tune the performance of a server. For example, a developer can expand certain service areas that receive heavy use. Similarly, a developer can discard portions of an online service that are infrequently used, cost-justify a more powerful server to run the service, assess how often a user is "referred" to this service from another service, etc.

The Debugger Subtool

To facilitate the development of an online service, a Debugger subtool exists. The Debugger subtool provides a means for the developer to "run" an online service that is being developed. The Debugger subtool simulates an access to an online service from user client software such that a developer can test an online service by accessing the online service in the same manner that a user would, The Debugger subtool, can be stopped at any point. When the Debugger is stopped, the developer can use an appropriate Utility Subtool to modify the currently displayed hyperdocument or subservice infrastructure (or any other part of the service). After modifying the subservice, the developer can resume the simulation of the online service from the stopping place. The Debugger also allows the developer to single-step through scripts, inspect and change script variables, and even modify the scripts themselves, like conventional debuggers for interpreted languages in other application domains.

Although the present invention has been described in terms of specific exemplary embodiments, it will be appreciated that various modifications and alterations might be made by those skilled in the art without departing from the spirit and scope of the invention as set forth in the following claims.

What is claimed is:

1. A system for developing an online service with a computer, comprising the elements of:
　　(a) a first editor for enabling a user to edit a data store that contains information comprising the online service;
　　(b) a second editor for enabling the user to define an interactive behavior of said online service, said second editor having a visual user interface for editing:
　　　　(i) a format in which said information from said data store of said online service is displayed;
　　　　(ii) a set of functional features provided by said online service; and
　　　　(iii) a set of visual objects for accessing said functional features, said set of visual objects being accessed by the user of the online service; and
　　(c) a fee setting tool, said fee setting tool for enabling the user to set fees associated with said online service for an entity.

2. The system of claim 1, wherein each of said fees are triggered by a defined user action.

3. The system of claim 2, wherein one of said defined user actions comprises access by said user to one of said visual objects on the online service.

4. The system of claim 2, wherein one of said defined user actions comprises submittal of an object for inclusion in said data store of said online service.

5. The system of claim 2, wherein one of said defined user actions comprises a traverse of a hyperlink.

6. The system of claim 2, wherein one of said defined user actions comprises a connection to the online service.

7. The system of claim 1, wherein each of said fees are triggered by passage of a defined amount of time.

8. The system of claim 1, wherein said fee setting tool defines a fee specifier for each fee, said fee specifier comprising a first field specifying a fee action that triggers said fee.

9. The system of claim 8, wherein said fee specifier further comprises a second field specifying an entity to whom the fee is directed.

10. The system of claim 8, wherein said fee specifier further comprises a third field specifying an object associated with said fee action.

11. The system of claim 8, wherein said fee specifier further comprises a fourth field defining a fee computation.

12. The system of claim 11, further comprising:
a script editor, said script editor for editing a script specifying said fee computation.

13. The system of claim 11, wherein said fourth field comprises a script specifying said fee computation.

14. The system of claim 13, wherein said script comprises at least one fee setting script primitive.

15. The system of claim 1, wherein said online service comprises a plurality of subservice programs.

16. The system of claim 1, wherein if said fee is positive, a fee is charged to said entity, and if said fee is negative, a payment is made to said entity.

17. The system of claim 1, wherein said online service distributes information using a Hyper Text Transport Protocol (HTTP), said information comprising a hypermedia document.

18. The system of claim 17, wherein said online service distributes information on the global Internet.

19. The system of claim 17, wherein said hypermedia document comprises a Hyper_Text Markup Language (HTML) document.

20. A system for specifying fees for an entity associated with an online service comprising:
(a) means associated with an object of the online service for defining at least one of a plurality of triggering actions for a fee;
(b) means associated with a triggering action for defining a fee specification for the entity;
(c) means for editing a plurality of fee specifications for the entity; and
(d) means for storing the plurality of fee specifications using the editing means.

21. A system for determining a fee for an entity associated with an online service, comprising:
(a) means for detecting at least one of a plurality of actions on an object of the online service, said object being associated with an action;
(b) means, operative in response to detection of the action, for identifying a fee specification for the action and the object associated with the action;
(c) means for utilizing the fee specification to define the fee for the entity; and
(d) means for storing a plurality of fee specifications.

22. The system of claim 21, further comprising a fee specifier for specifying fees for the entity associated with the online service, comprising:
(a) means associated with an object of the online service for defining at least one of a plurality of triggering actions for a fee;
(b) means associated with the triggering action for defining a fee for the entity;
(c) means for editing a plurality of fee specifications for the entity; and
(d) means for storing the plurality of fee specifications using the means for editing.

23. The system of claim 20, wherein each of said fees are triggered by a defined user action.

24. The system of claim 23, wherein one of said defined user actions comprises access by a user to one of said objects on said online system that is a visual object.

25. The system of claim 23, wherein one of said defined user actions comprises submittal of an object for inclusion in a data store of said online service.

26. The system of claim 23, wherein one of said defined user actions comprises a traverse of a hyperlink.

27. The system of claim 23, wherein one of said defined user actions comprises a connection to an online service.

28. The system of claim 20, wherein each of said fees are triggered by passage of a defined amount of time.

29. The system of claim 20 wherein said means for defining the fee specification define a fee specifier, wherein the fee specifier comprises a first field specifying a triggering action that triggers said fee.

30. The system of claim 29, wherein said fee specifier further comprises a second field specifying an entity to whom the fee is directed.

31. The system of claim 29, wherein said fee specifier further comprises a third field specifying an object associated with said fee.

32. The system of claim 29, wherein said fee specifier further comprises a fourth field defining a fee computation formula.

33. The system of claim 32, further comprising:
a script editor, said script editor enabling editing a script specifying said fee computation.

34. The system of claim 32, wherein said fourth field comprises a script specifying said fee computation formula.

35. The system of claim 34, wherein said script comprises at least one fee setting script primitive.

36. The system of claim 20, wherein if said fee is positive, a fee is charged to an entity, and if said fee is negative, a payment is made to said entity.

37. The system of claim 20, wherein a document object includes a Hyper_Text Markup Language (HTML) document.

38. A system for developing an online service with a computer, comprising:
(a) a first editing module for displaying and enabling editing of relationships among document objects of the online service;
(b) a second editing module for enabling editing of individual document objects of the online service;
(c) a mechanism for invoking the second editing module in response to selection of a document object in the first editing module;
(d) means associated with said document object of the online service for defining at least one of a plurality of triggering actions for a fee;
(e) means associated with a triggering action for defining a fee specification for an entity;
(f) means for editing the fee specification for the entity; and
(g) means for storing a plurality of fee specifications using at least one of said first editing module and said second editing module.

39. The system of claim 38, wherein the relationships among the document objects are hyperlinks between the document objects.

40. A system for developing an online service with a computer, comprising:
   (a) a viewing module for displaying relationships among and enabling selection of document objects of the online service;
   (b) an editing module for editing individual document objects of the online service;
   (c) a linking mechanism for invoking the editing module in response to selection of a document object in the viewing module;
   (d) means associated with said document object of the online service for defining at least one of a plurality of triggering actions for a fee;
   (e) means associated with a triggering action for defining a fee specification for an entity;
   (f) means for editing the fee specification for the entity; and
   (g) means for storing a plurality of fee specifications using the viewing module and the editing module.

41. A system for editing fee structures of an online service with a computer, comprising:
   (a) means for displaying a visual representation of a fee specification having user-modifiable portions, wherein a user-modifiable portion is provided for entry of an indication of a document object of the online service, an indication of an event in connection with the document object, and a fee formula;
   (b) means for receiving user input to edit a fee specification using the visual representation and for storing edited fee specifications; and
   (c) means for storing a plurality of fee specifications defined using the means for displaying and means for receiving.

42. The system of claim 41, wherein the visual representation is a template.

43. The system of claim 41, wherein the fee formula is defined using a scripting language.

44. The system of claim 41, wherein the plurality of fee specifications are stored in a list.

* * * * *